US011869391B2

(12) United States Patent
Lee

(10) Patent No.: US 11,869,391 B2
(45) Date of Patent: Jan. 9, 2024

(54) DISPLAY DEVICE

(71) Applicant: LG Display Co., Ltd., Seoul (KR)

(72) Inventor: Moonsun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 155 days.

(21) Appl. No.: 17/546,713

(22) Filed: Dec. 9, 2021

(65) Prior Publication Data

US 2022/0189350 A1 Jun. 16, 2022

(30) Foreign Application Priority Data

Dec. 14, 2020 (KR) ........................ 10-2020-0174425

(51) Int. Cl.
*G09F 9/30* (2006.01)

(52) U.S. Cl.
CPC .................................... *G09F 9/301* (2013.01)

(58) Field of Classification Search
CPC ........................................................ G09F 9/301
See application file for complete search history.

(56) References Cited

U.S. PATENT DOCUMENTS

| | | | | |
|---|---|---|---|---|
| 9,756,757 | B2 * | 9/2017 | Park | H05K 7/16 |
| 9,826,654 | B2 * | 11/2017 | Fujii | G09F 15/0012 |
| 9,864,412 | B2 * | 1/2018 | Park | G06F 1/1652 |
| 11,089,700 | B2 * | 8/2021 | Kang | G09F 9/301 |
| 11,112,631 | B2 * | 9/2021 | Oh | G02F 1/133608 |
| 11,270,606 | B2 * | 3/2022 | Kwon | H05K 5/0017 |
| 11,626,041 | B2 * | 4/2023 | Park | G06F 1/1681 361/679.01 |
| 11,670,199 | B2 * | 6/2023 | Kang | G06F 1/1652 361/679.01 |
| 2009/0302176 | A1 | 12/2009 | Kuroi et al. | |
| 2016/0363960 | A1 * | 12/2016 | Park | G09F 15/0062 |
| 2016/0374228 | A1 * | 12/2016 | Park | G09F 9/301 |
| 2020/0267247 | A1 * | 8/2020 | Song | H04M 1/0237 |
| 2021/0051809 | A1 * | 2/2021 | Song | G06F 1/1652 |
| 2022/0130288 | A1 * | 4/2022 | Park | G06F 1/1652 |

FOREIGN PATENT DOCUMENTS

| | | |
|---|---|---|
| CN | 101689066 A | 3/2010 |
| CN | 106097896 A | 11/2016 |
| CN | 106486018 A | 3/2017 |

(Continued)

OTHER PUBLICATIONS

Chinese Office Action dated Oct. 25, 2023 for Application No. 202111474834.2.

*Primary Examiner* — Lisa Lea-Edmonds
(74) *Attorney, Agent, or Firm* — Birch, Stewart, Kolasch & Birch, LLP

(57) ABSTRACT

A display device includes a display panel, a back cover which is disposed on a bottom surface of the display panel and has a plurality of protrusions on both sides, and a plurality of protective blocks which is inserted into grooves of the plurality of protrusions on some sides of the back cover. The plurality of protective blocks includes a first part which has a protrusion at one side and a groove at another side, a second part which is opposite to the first part, a third part which connects the first part and the second part, and a fourth part which protrudes from the first part to the second part and is inserted into the grooves of the plurality of protrusions.

19 Claims, 19 Drawing Sheets

(56) References Cited

FOREIGN PATENT DOCUMENTS

| | | | |
|---|---|---|---|
| CN | 109427253 | A | 3/2019 |
| CN | 109961693 | A | 7/2019 |
| CN | 111161633 | A | 5/2020 |
| CN | 111550525 | A | 8/2020 |
| KR | 2003-0095870 | A | 12/2003 |
| KR | 10-1975188 | B1 | 5/2019 |

* cited by examiner

DISPLAY DEVICE

CROSS-REFERENCE TO RELATED APPLICATIONS

This application claims priority to Korean Patent Application No. 10-2020-0174425 filed on Dec. 14, 2020, in the Korean Intellectual Property Office, the entire contents of which are expressly incorporated by reference into the present application.

BACKGROUND

Field

The present disclosure relates to a display device, and more particularly, to a rollable display device which is capable of displaying images even in a rolled state.

Description of the Related Art

As display devices which are used fora monitor of a computer, a television, or a cellular phone, there are an organic light emitting display (OLED) device which is a self-emitting device, a liquid crystal display (LCD) device which needs a separate light source, and the like.

An applicable range of the display device is diversified to personal digital assistants as well as monitors of computers and televisions, and a display device with a large display area and a reduced volume and weight is being studied.

Recently, a rollable display device which is manufactured by forming a display element, a wiring line, and the like on a flexible substrate such as plastic which is a flexible material so as to be capable of displaying images even in a rolled state of the display device is getting attention as the next generation display device.

SUMMARY OF THE DISCLOSURE

An object to be achieved by the present disclosure is to provide a display device which includes a back cover with an improved impact resistance by supplementing an edge of the back cover.

Another object to be achieved by the present disclosure is to provide a display device which minimizes an unevenness defect of a display panel.

Objects of the present disclosure are not limited to the above-mentioned objects, and other objects, which are not mentioned above, can be clearly understood by those skilled in the art from the following descriptions.

In order to achieve the above-described objects and other objects, according to an aspect of the present disclosure, a display device includes a display panel, a back cover which is disposed on a bottom surface of the display panel and has a plurality of protrusions on some sides of the back cover, and a plurality of protective blocks which is inserted into grooves of the plurality of protrusions on the sides of the back cover. The plurality of protective blocks can include a first part which has a protrusion at one side and a groove at the other side, a second part which is opposite to the first part, a third part which connects the first part and the second part, and a fourth part which protrudes from the first part toward the second part and is inserted into the grooves of the plurality of protrusions.

In order to achieve the above-described and other objects, according to another aspect of the present disclosure, a display device includes a back cover which supports a bottom surface of a display panel, a plurality of protrusions which protrudes from both sides of the back cover toward the outside of the back cover, a groove which is disposed in each of the plurality of protrusions, and a plurality of protective blocks into which the plurality of protrusions of the back cover is inserted. The plurality of protective blocks can be fastened with the grooves of the plurality of protrusions. The plurality of protective blocks includes a first part having a protrusion and a groove, a second part which is opposite to the first part, a third part which connects the first part and the second part, and a fourth part which is configured to protrude from the first part or the second part to be inserted into the grooves of the plurality of protrusions of the back cover, and a protrusion of a first part of the other protective block can be inserted into the groove of the first part of the protective block.

Other detailed matters of the exemplary embodiments are included in the detailed description and the drawings.

According to the present disclosure, the edge of the back cover is supplemented so as not to be exposed to the outside so that an impact resistance for the side surface of the back cover which may be vulnerable to the impact can be ensured and the safety of the user from a sharp back cover edge can be ensured.

According to the present disclosure, a curl phenomenon of the display panel due to the temperature and humidity change can be supplemented.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
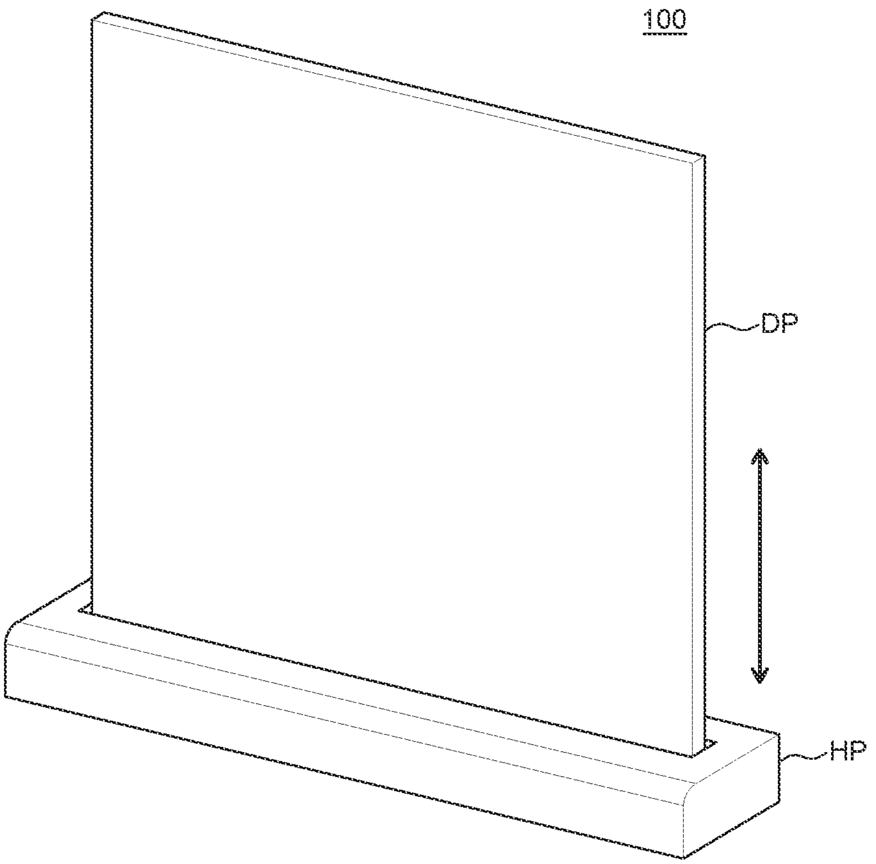
FIGS. 1A and 1B are perspective views of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" the other element or layer, another layer or another element can be interposed directly on the other element or therebetween.

Although the terms "first", "second", and the like are used for describing various components, these components are not confined by these terms. These terms are merely used for distinguishing one component from the other components and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to accompanying drawings. All the components of each display device according to all embodiments of the present disclosure are operatively coupled and configured.

<Display Device-Rollable Display Device>

A rollable display device can be referred to as a display device which is capable of displaying images even though it is rolled. The rollable display device can have a high flexibility as compared with a general display device of the related art. Depending on whether to use a rollable display device, a shape of the rollable display device can freely vary. Specifically, when the rollable display device is not used, the rollable display device is rolled to be stored with a reduced volume. In contrast, when the rollable display device is used, the rolled rollable display device is unrolled to be used.

Figure 1B:
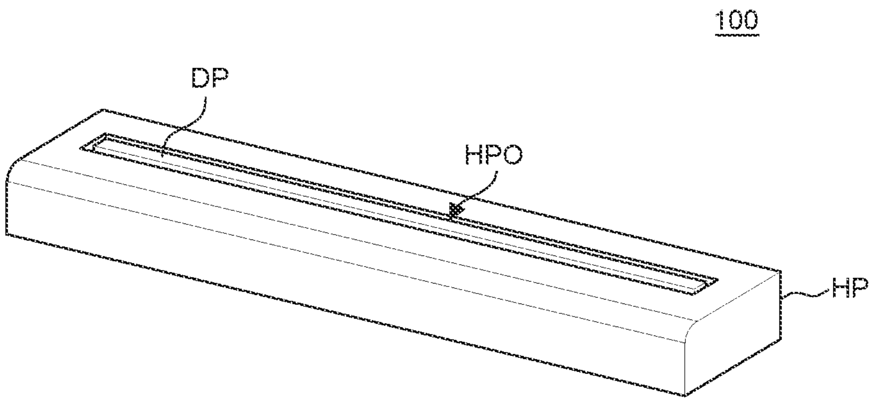

FIGS. 1A and 1B are perspective views of a display device according to an exemplary embodiment of the present disclosure.

Referring to FIGS. 1A and 1B, a display device according to an exemplary embodiment of the present disclosure includes a display unit DP and a housing unit HP.

The display unit DP is a configuration for displaying images to a user and for example, in the display unit DP, a display element and a circuit, a wiring line, a component, and the like for driving the display element can be disposed. In this case, since the display device 100 according to the exemplary embodiment of the present disclosure is a rollable display device 100, the display unit DP can be configured to be wound and unwound. For example, the display unit DP can be formed of a display panel 120 and a first cover 110*a* each having a flexibility to be wound or unwound. The display unit DP will be described below in more detail with reference to FIGS. 4A and 4B.

The housing unit HP is a case in which the display unit DP is accommodated. The housing unit HP has an opening HPO to allow the display unit DP to move to the inside and the outside of the housing unit HP.

In the meantime, the display unit DP of the display device 100 can be switched from a fully unwound state as illustrated in FIG. 1A to a fully wound state as illustrated in FIG. 1B or from a fully wound state to a fully unwound state.

In order to switch the display unit DP to a fully unwound state or a fully wound state, a driving unit MP which winds or unwinds the display unit DP is disposed.

<Driving Unit>

Figure 2:
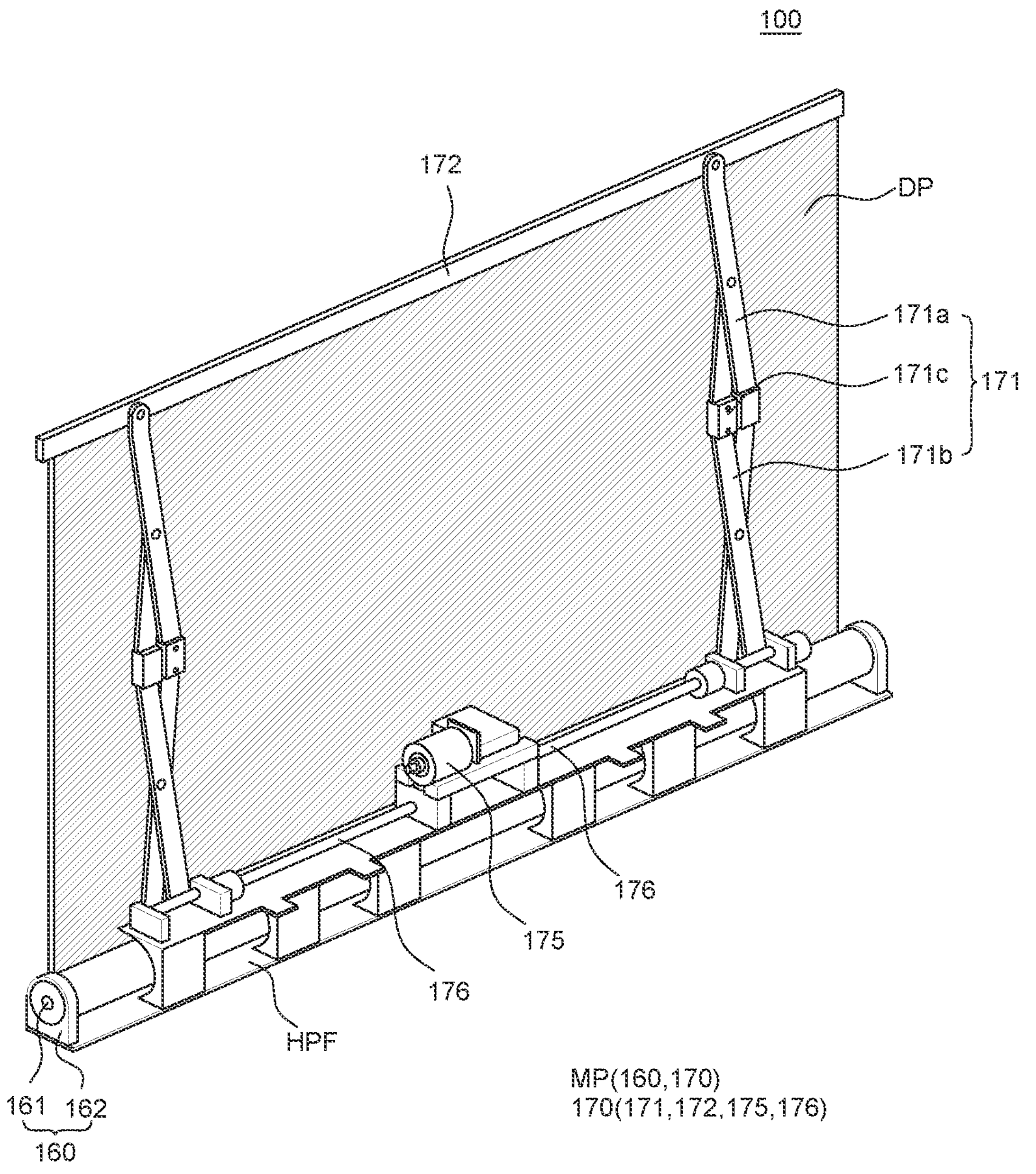
FIG. 2 is a perspective view of a display device according to an exemplary embodiment of the present disclosure.
Figure 3:
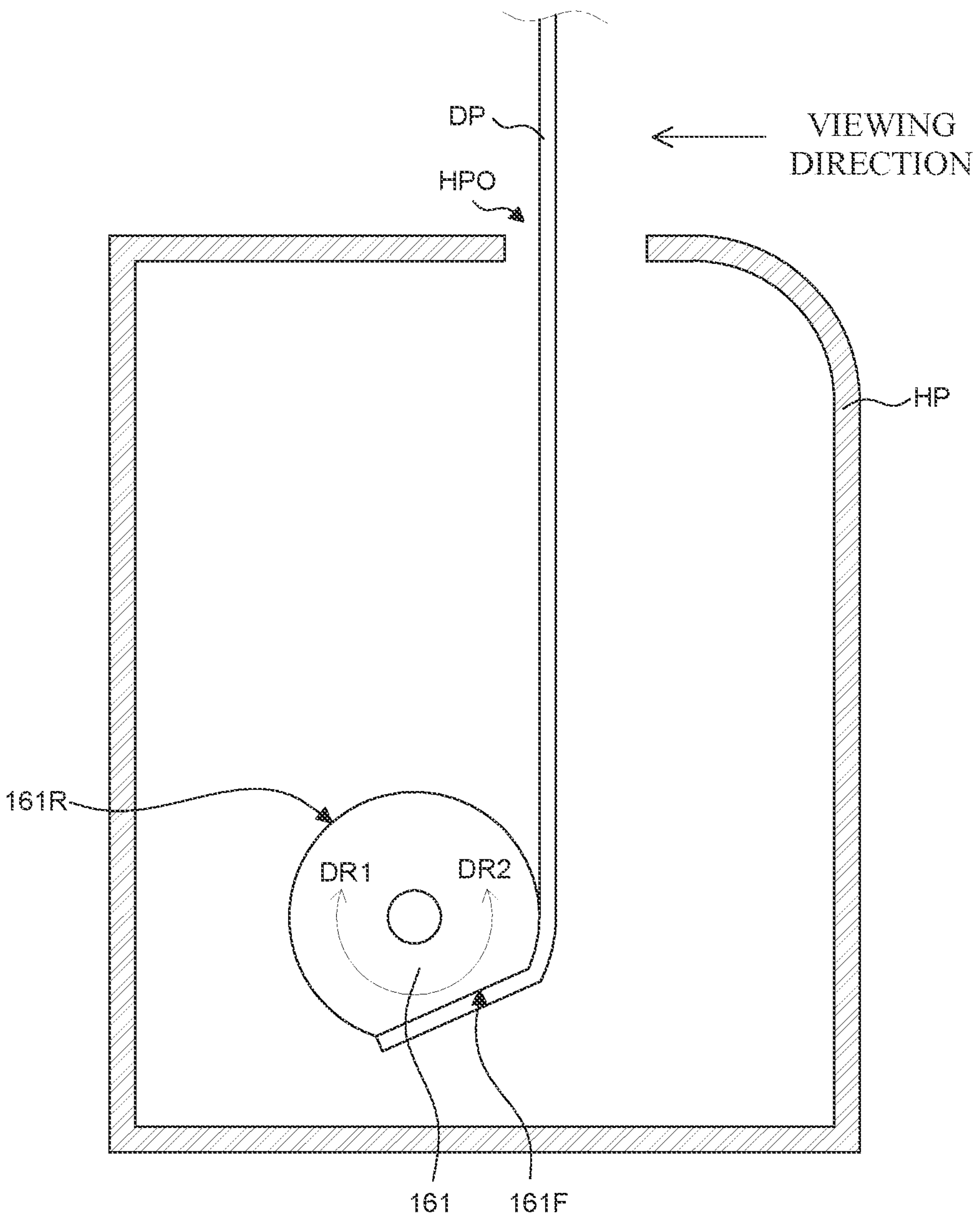
FIG. 3 is a schematic cross-sectional view of a display device according to an exemplary embodiment of the present disclosure.

FIG. 2 is a perspective view of a display device according to an exemplary embodiment of the present disclosure. FIG. 3 is a schematic cross-sectional view of a display device according to an exemplary embodiment of the present disclosure. Particularly, FIG. 3 is a schematic cross-sectional view for explaining a roller 161 and a display unit DP of a display device 100 according to an exemplary embodiment of the present disclosure. For the convenience of description, in FIG. 3, only a housing unit HP, a roller 161, and a display unit DP are illustrated.

First, referring to FIG. 2, the driving unit MP includes a roller unit 160 and a lifting unit 170.

The roller unit 160 rotates in a clockwise direction or a counterclockwise direction to wind or unwind the display unit DP fixed to the roller unit 160. The roller unit 160 includes a roller 161 and a roller support unit 162.

The roller 161 is a member around which the display unit DP is wound. The roller 161 can be, for example, formed to have a cylindrical shape. A lower edge of the display unit DP can be fixed to the roller 161. When the roller 161 rotates, the display unit DP which is fixed to the roller 161 through the lower edge can be wound around the roller 161. In contrast, when the roller 161 rotates in an opposite direction, the display unit DP which is wound around the roller 161 can be unwound from the roller 161.

Referring to FIG. 3, the roller 161 can be formed to have a cylindrical shape in which at least a part of an outer circumferential surface of the roller 161 is flat and the remaining part of the outer circumferential surface is a curved portion. Even though the roller 161 can have entirely a cylindrical shape, but a part thereof can be formed of a flat surface. For example, a part of the outer circumferential surface of the roller 161 is formed to be flat and the remaining part of the outer circumferential surface is formed to be a curved surface. For example, the roller 161 is configured by a curved portion 161R and a flat portion 161F and in the flat portion 161F of the roller 161, the plurality of flexible films and the printed circuit board of the display unit DP can be seated. However, the roller 161 can have a completely cylindrical shape or an arbitrary shape which can wind the display unit DP, but is not limited thereto.

Referring to FIG. 2 again, the roller support unit 162 supports the roller 161 at both sides of the roller 161. Specifically, the roller support unit 162 is disposed on a bottom surface HPF of the housing unit HP. Upper side surfaces of the roller support unit 162 are coupled to both ends of the roller 161. By doing this, the roller support unit 162 can support the roller 161 to be spaced apart from the bottom surface HPF of the housing unit HP. In this case, the roller 161 can be rotatably coupled to the roller support unit 162.

The lifting unit 170 moves the display unit DP in a vertical direction in accordance with the driving of the roller unit 160. The lifting unit 170 includes a link unit 171, a head bar 172, a motor 175, and a rotary unit 176.

The link unit 171 of the lifting unit 170 includes a plurality of links 171*a* and 171*b* and a hinge unit 171*c* which connects the plurality of links 171*a* and 171*b* to each other. Specifically, the plurality of links 171*a* and 171*b* includes a first link 171*a* and a second link 171*b* and the first link 171*a* and the second link 171*b* cross each other in the form of scissors to be rotatably fastened by means of the hinge unit 171*c*. The link unit 171 can be configured by a plurality of intersecting links 171*a* and 171*b*, but the number of links is not limited so that the link unit can be configured by a single link. When the link unit 171 moves in the vertical direction, the plurality of links 171*a* and 171*b* rotates to be far away from each other or close to each other. The link unit 171 can be configured by a plurality of intersecting links 171*a* and 171*b*, but it is not limited so that the link unit can be configured by a single link which does not intersect.

The head bar 172 of the lifting unit 170 is fixed to an uppermost end of the display unit DP. The head bar 172 is coupled to the link unit 171 to move the display unit DP in the vertical direction in accordance with the rotation of the plurality of links 171*a* and 171*b* of the link unit 171. For example, the display unit DP can move in a vertical direction by the head bar 172 and the link unit 171.

The head bar 172 covers only a part of a surface which is adjacent to an uppermost edge of the display unit DP so as not to hide an image displayed on the front surface of the display unit DP. The display unit DP and the head bar 172 can be fixed by a screw, but are not limited thereto.

The motor 175 is connected to a power generating unit, such as a separate external power source or a built-in battery, to be supplied with the power. The motor 175 generates a torque to provide a driving force to the rotary unit 176.

The rotary unit 176 is connected to the motor 175 to be configured to convert a rotational motion from the motor 175 into a linear reciprocating motion. For example, the rotational motion of the motor 175 can be converted into the linear reciprocating motion of a structure fixed to the rotary unit 176. For example, the rotary unit 176 can be implemented by a ball screw including a shaft and a nut which is fastened with the shaft, but is not limited thereto.

The motor 175 and the rotary unit 176 interwork with the link unit 171 to lift and lower the display unit DP. The link unit 171 is formed with a link structure to receive the driving force from the motor 175 and the rotary unit 176 to be repeatedly folded or unfolded.

Specifically, when the display unit DP is wound, the motor 175 is driven so that the structure of the rotary unit 176 can perform linear motion. For example, a part of the rotary unit 176 to which one end of the second link 171*b* is coupled can perform the linear motion. Therefore, one end of the second link 171*b* can move to the motor 175 and the plurality of links 171*a* and 171*b* is folded so that the height of the link unit 171 can be lowered. Further, while the plurality of links 171*a* and 171*b* is folded, the head bar 172 coupled to the first link 171*a* is also lowered and one end of the display unit DP coupled to the head bar 172 is also lowered.

When the display unit DP is unwound, the motor 175 is driven so that the structure of the rotary unit 176 can perform linear motion. For example, a part of the rotary unit 176 to which one end of the second link 171*b* is coupled can perform the linear motion. Therefore, one end of the second link 171*b* can move to be far away from the motor 175 and the plurality of links 171*a* and 171*b* is unfolded so that the height of the link unit 171 can be increased. Further, while the plurality of links 171*a* and 171*b* is unfolded, the head bar 172 coupled to the first link 171*a* is also lifted and the display unit DP coupled to the head bar 172 is also lifted.

Accordingly, when the display unit DP is fully wound around the roller 161, the link unit 171 of the lifting unit 170 maintains a folded state. For example, when the display unit DP is fully wound around the roller 161, the lifting unit 170 can have a smallest height. In contrast, when the display unit DP is fully unwound, the link unit 171 of the lifting unit 170 maintains an unfolded state. For example, when the display unit DP is fully unwound, the lifting unit 170 can have a highest height.

In the meantime, when the display unit DP is wound, the roller 161 can rotate and the display unit DP can be wound around the roller 161. Referring to FIG. 3, for example, a lower edge of the display unit DP is coupled to the roller 161. When the roller 161 rotates in a first direction DR1, for example, a clockwise direction, the display unit DP can be wound while a rear surface of the display unit DP is in close contact with a surface of the roller 161.

When the display unit DP is unwound, the roller 161 can rotate and the display unit DP can be unwound from the roller 161. For example, referring to FIG. 3, when the roller 161 rotates in a second direction DR2, for example, in a counterclockwise direction, the display unit DP which is wound around the roller 161 is unwound from the roller 161 to be disposed at the outside of the housing unit HP.

In some exemplary embodiments, a driving unit MP having another structure other than the above-described driving unit MP can be applied to the display device 100. For example, as long as the display unit DP is wound and unwound, the above-described configuration of the roller unit 160 and the lifting unit 170 can be modified, some configurations can be omitted, or another configuration can be further added.

<Display Unit>

Figure 4A:
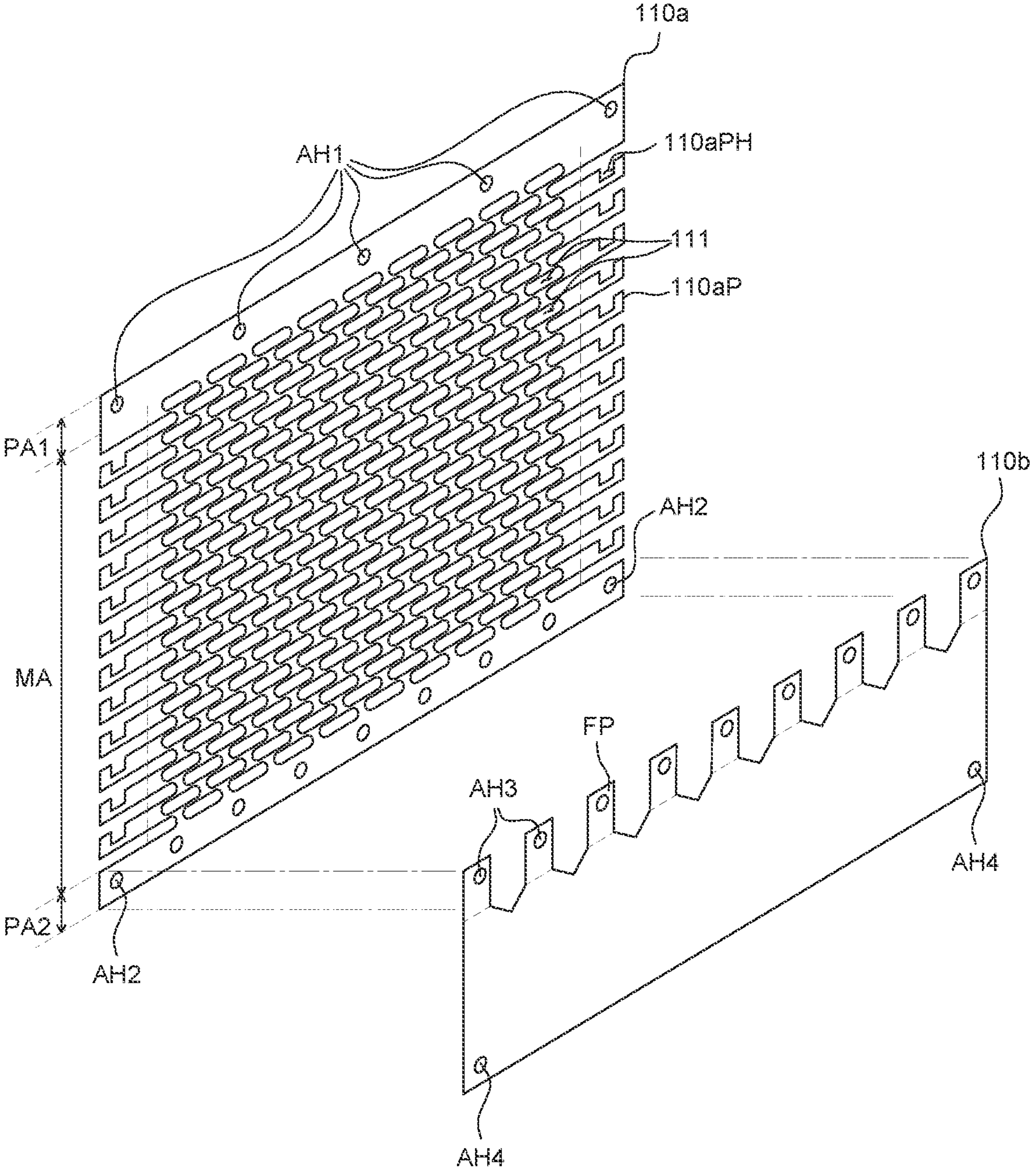
FIG. 4A is an exploded perspective view for explaining a first cover and a second cover of a display device according to an exemplary embodiment of the present disclosure.
Figure 4B:
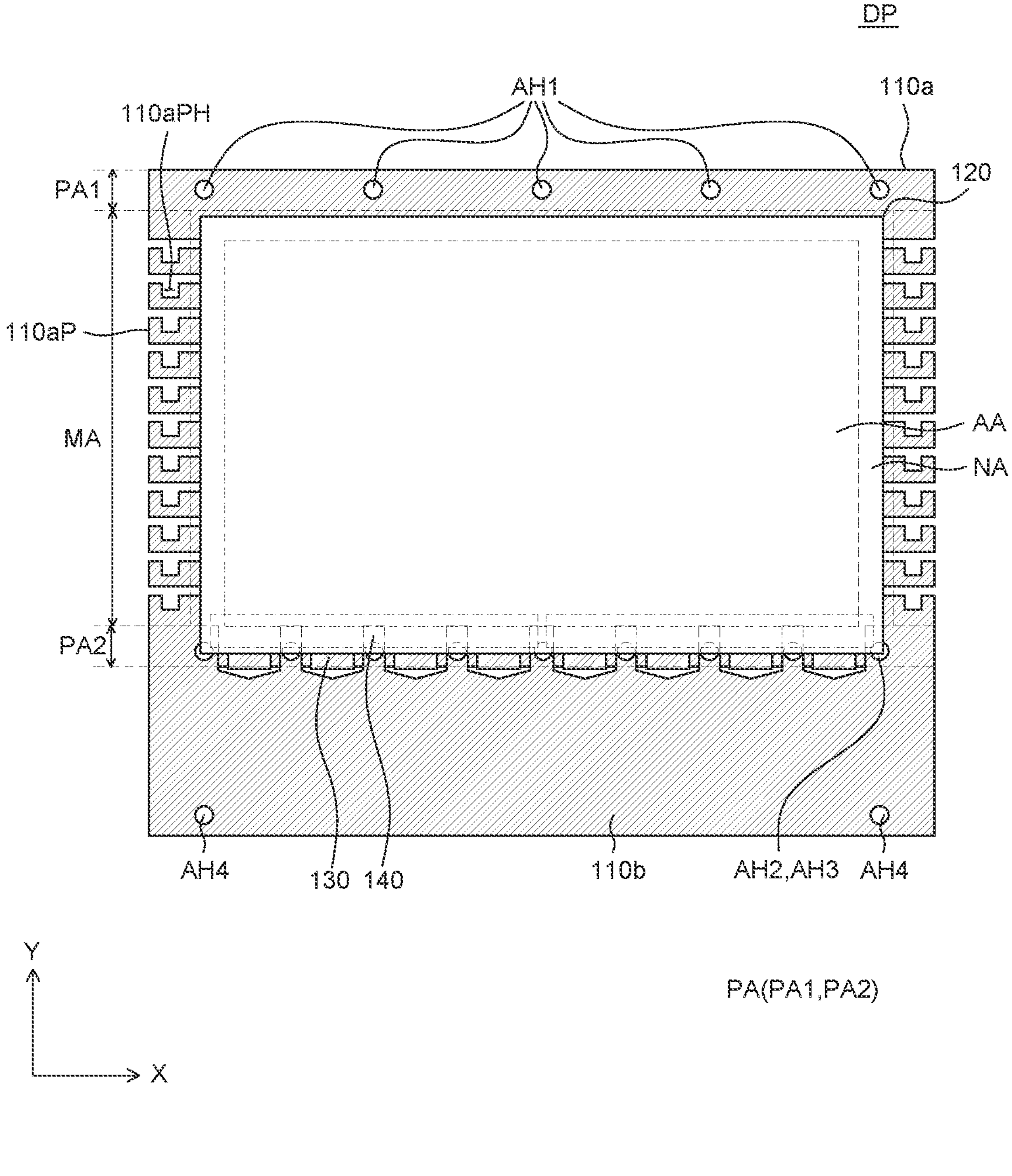
FIG. 4B is a plan view of a display unit of a display device according to an exemplary embodiment of the present disclosure.

FIG. 4A is an exploded perspective view for explaining a first cover and a second cover of a display device according to an exemplary embodiment of the present disclosure. FIG. 4B is a plan view of a display unit of a display device according to an exemplary embodiment of the present disclosure.

Referring to FIGS. 4A and 4B, the display unit DP includes a first cover 110*a*, a display panel 120, a plurality of flexible films 130, a printed circuit board 140, and a second cover 110*b*. However, it is not limited thereto and the display unit DP can be defined to include only a display panel 120, a plurality of flexible films 130, and a printed circuit board 140. In FIGS. 4A and 4B, for the convenience of description, a cover unit and a plurality of protective blocks are not illustrated.

Referring to FIGS. 4A and 4B, the first cover 110*a* is disposed on a rear surface of the display panel 120 to support the display panel 120. The first cover 110*a* is disposed on the rear surface of the display panel 120 so that the first cover can be referred to as a back cover. A size of the first cover 110*a* can be larger than a size of the display panel 120. The first cover 110*a* can protect other configurations of the display unit DP from the outside.

Even though the first cover 110*a* is formed of a material having a rigidity, at least a part of the first cover 110*a* can have a flexibility to be wound or unwound together with the display panel 120. For example, the first cover 110*a* can be formed of a metal material such as steel use stainless SUS or invar, plastic, or the like. However, if the material of the first cover 110*a* satisfies physical conditions such as a thermal strain, a radius of curvature, and a rigidity, the material can be diversely changed depending on the design, and is not limited thereto.

The first cover 110*a* can be fastened with the head bar 172 and the second cover 110*b*.

The first cover 110*a* includes a plurality of support areas PA and a malleable area MA. The plurality of support areas PA is areas where a plurality of openings 111 is not disposed and the malleable area MA is an area where a plurality of openings 111 is disposed. Specifically, the first cover 110*a* includes a first support area PA1, a malleable area MA, and a second support area PA2 and the first support area PA1, the malleable area MA, and the second support area PA2 are sequentially disposed from an uppermost end of the first cover 110*a*. In this case, since the first cover 110*a* is wound or unwound in a Y direction, the plurality of support areas PA and the malleable area MA can be disposed along the Y direction.

The first support area PA1 of the first cover 110*a* is an uppermost area of the first cover 110*a* and is fastened with the head bar 172. The first support area PA1 includes first fastening holes AH1 to be fastened with the head bar 172. For example, screws which pass through the head bar 172 and the first fastening holes AH1 are disposed so that the head bar 172 can be fastened with the first support area PA1. As the first support area PA1 is fastened with the head bar 172, when the link unit 171 which is fastened with the head bar 172 is lifted or lowered, the first cover 110*a* can also be lifted and lowered together with the display panel 120 which is attached to the first cover 110*a*. Even though five first fastening holes AH1 are illustrated in FIGS. 4A and 4B, the number of first fastening holes AH1 is not limited thereto. Further, even though it has been described that the first cover 110*a* is fastened with the head bar 172 using the first fastening holes AH1, it is not limited thereto and the first cover 110*a* and the head bar 172 can be fastened with each other without using a separate fastening hole.

The malleable area MA of the first cover 110*a* is an area extending from the first support area PA1 to a lower side of the first cover 110*a*. The malleable area MA is an area in which a plurality of openings 111 is disposed and the display panel 120 is attached. Specifically, the malleable area MA is an area which is wound around or unwound from the roller 161 together with the display panel 120. The malleable area MA can overlap at least the display panel 120 among other configurations of the display unit DP.

In the malleable area MA, the first cover 110*a* can have a plurality of protrusions 110*a*P on both sides of the first cover 110*a*. The plurality of protrusions 110*a*P can be disposed on a left side and a right side of the first cover 110*a* excluding an upper side which is connected to the head bar 172 and a lower side which is connected to the second cover 110*b*. The plurality of protrusions 110*a*P can be spaced apart from each other with the plurality of openings 111 therebetween. The plurality of protrusions 110*a*P can have a bar shape, but is not limited thereto.

The plurality of protrusions 110*a*P of the first cover 110*a* can have a plurality of grooves 110*a*PH into which the plurality of protective blocks 180 is inserted. Specifically, one protrusion 110*a*P of the first cover 110*a* can have one groove 110*a*PH as illustrated in FIGS. 4A and 4B. Each of the plurality of grooves 110*a*PH has a shape which is recessed from an upper side of the plurality of protrusions 110*a*P to a lower side. For example, the plurality of grooves 110*a*PH can have a shape which is recessed from the first support area PA1 of the first cover 110*a* to which the head bar 172 is connected, toward the second support area PA2 connected to the second cover 110*b*. At this time, each of the plurality of grooves 110*a*PH can have the same size, but is not limited thereto.

The second support area PA2 of the first cover 110a is an area which extends from the malleable area MA and is a lowermost side of the first cover 110a. One end of the display panel 120 is disposed in the second support area PA2. For example, a pad area which is a non-active area NA at one end of the display panel 120 can be disposed in the second support area PA2.

Referring to FIG. 4A, second fastening holes AH2 are disposed in the second support area PA2. The second fastening holes AH2 can be holes through which the cover unit to be described below and the second cover 110b, and the first cover 110a are fixed to each other. Even though nine second fastening holes AH2 are illustrated in FIG. 4A, the number of second fastening holes AH2 is illustrative and is not limited thereto.

In the meantime, in the first support area PA1 and the second support area PA2, the plurality of openings 111 as formed in the malleable area MA is not formed. Specifically, in each of the first support area PA1 and the second support area PA2, only the first fastening holes AH1 and the second fastening holes AH2 are formed, but the plurality of openings 111 as formed in the malleable area MA is not formed. Further, the first fastening holes AH1 and the second fastening holes AH2 have different shapes from that of the plurality of openings 111.

The first support area PA1 is an area fixed to the head bar 172 and the second support area PA2 is an area where one end of the display panel 120, the plurality of flexible films 130, and the printed circuit board 140 are supported and has a rigidity larger than that of the malleable area MA. Further, as the first support area PA1 and the second support area PA2 have the rigidity, the first support area PA1 and the second support area PA2 can be firmly fixed to the head bar 172 and the second cover 110b. The second support area PA2 maintains the pad area at one end of the display panel 120 and the printed circuit board 140 to be flat to protect the pad area of the display panel 120 and the printed circuit board 140. Therefore, the display unit DP is fixed to the head bar 172 of the driving unit MP to move to the inside or the outside of the housing unit HP in accordance with the operation of the driving unit MP and protect the pad area at one end of the display panel 120 and the printed circuit board 140.

In the meantime, in FIG. 4A, even though it is illustrated that the plurality of support areas PA and the malleable area MA of the first cover 110a are sequentially disposed along the Y direction. However, when the first cover 110a is wound in an X direction, the plurality of support areas PA and the malleable area MA can be sequentially disposed along the X direction.

When the display unit DP is wound or unwound, the plurality of openings 111 disposed in the malleable area MA of the first cover 110a can be deformed by a stress which is applied to the display unit DP. Specifically, when the display unit DP is wound or unwound, the malleable area MA of the first cover 110a can be deformed as the plurality of openings 111 contracts or expands. Further, as the plurality of openings 111 contracts or expands, a slip phenomenon of the display panel 120 disposed on the malleable area MA of the first cover 110a is minimized so that the stress which is applied to the display panel 120 can be minimized.

The second cover 110b is fastened with the first cover 110a and the roller 161 to connect the first cover 110a and the roller 161. The second cover 110b connects the first cover 110a and the roller 161 by the above-described method and finally can connect the display panel 120 disposed in the first cover 110a to the roller 161. However, it is not limited thereto so that as long as the second cover 110b is connected to the first cover 110a and the roller 161, a shape or a connection method of the second cover 110b can vary in various ways depending on the design and is not limited thereto.

One end of the second cover 110b which is an uppermost area of the second cover 110b can overlap one end of the first cover 110a. For example, one end of the second cover 110b can overlap the second support area PA2. One end of the second cover 110b overlaps a part of the first cover 110a to be connected or one end of the second cover 110b is connected to the part of the first cover 110a using a connection member, but is not limited thereto.

The second cover 110b can include a plurality of fastening units FP overlapping the first cover 110a. The plurality of fastening units FP is disposed at one end of the second cover 110b. Further, in the plurality of fastening units FP, a plurality of third fastening holes AH3 to be fastened with the first cover 110a can be disposed. The plurality of fastening units FP in which the plurality of third fastening holes AH3 is disposed is spaced apart from each other and a space which allows the plurality of flexible films 130 to be bent can be ensured between the plurality of fastening units FP. The third fastening holes AH3 can be holes through which the cover unit to be described below and the second cover 110b are fixed to each other. Even though nine third fastening holes AH3 are illustrated in FIG. 4A, the number of third fastening holes AH3 is illustrative and is not limited thereto.

In FIG. 4A, it is described that the second fastening holes AH2 and the third fastening holes AH3 to be fastened with the cover unit and the first cover 110a and the second cover 110b are disposed in the second support area PA2 of the first cover 110a and one end of the second cover 110b, respectively. However, the first cover 110a, the second cover 110b, and the cover unit can be fixed to each other without using a separate fastening hole.

In the meantime, when the second support area PA2 and the plurality of fastening units FP are wound around the roller 161, an outer circumferential surface of the roller 161 which overlaps the second support area PA2 and the plurality of fastening units FP can be a flat portion 161F. Therefore, the second support area PA2 can always maintain the flat state regardless of the wound or unwound state to the roller 161 and the pad area at one end of the display panel 120 and the printed circuit board 140 disposed in the second support area PA2 can also maintain the flat state.

An area from one end to the other end of the second cover 110b is an area which extends to dispose the active area AA of the display panel 120 at the outside of the housing unit HP. For example, when the first cover 110a and the display panel 120 are fully unwound, an area from the other end of the second cover 110b which is fixed to the roller 161 to one end of the second cover 110b in which the plurality of flexible films 130 and the printed circuit board 140 are disposed can be disposed in the housing unit HP. The malleable area MA and the first support area PA1 in which the active area AA of the display panel 120 is disposed can be disposed at the outside of the housing unit HP. For example, an area from the other end of the second cover 110b fixed to the roller 161 to at least a part of an end of the second cover 110b and the second support area PA2 can be disposed in the housing unit HP.

The other end of the second cover 110b is a lowermost area of the second cover 110b and is fastened with the roller 161. A fourth fastening hole AH4 can be formed at the other end of the second cover 110b to be fastened with the roller 161. For example, a fastening member which passes through the roller 161 and the fourth fastening holes AH4 is disposed to fasten the roller 161 and the other end of the second cover 110*b* with each other. As the other end of the second cover 110*b* is fastened with the roller 161, the display panel 120, the first cover 110*a*, and the second cover 110*b* can be wound around or unwound from the roller 161. Even though two fourth fastening holes AH4 are illustrated in FIG. 4A, the number of fourth fastening holes AH4 is not limited thereto.

In the meantime, in the second cover 110*b*, the plurality of openings 111 as formed in the malleable area MA of the first cover 110*a* is not formed. Specifically, only the third fastening holes AH3 and the fourth fastening holes AH4 are formed at one end and the other end of the second cover 110*b*, but the plurality of openings 111 as formed in the malleable area MA of the first cover 110*a* is not formed. Further, the third fastening hole AH3 and the fourth fastening hole AH4 have different shapes from that of the plurality of openings 111.

The second cover 110*b* can be formed of a material having a flexibility to be wound around or unwound from the roller 161. For example, the second cover 110*b* can be formed of a plastic material such as PET. However, if the material of the second cover 110*b* satisfies physical conditions such as a thermal strain, a radius of curvature, and a rigidity, the material can be diversely changed depending on the design, and is not limited thereto.

Even though in the present specification, it is described that the first cover 110*a* and the second cover 110*b* are separately formed, it is not limited thereto so that the first cover 110*a* and the second cover 110*b* can be integrally formed.

Referring to FIG. 4B, the display panel 120 is disposed on one surface of the first cover 110*a*. The display panel 120 is disposed in the malleable area MA, on one surface of the first cover 110*a*. The display panel 120 is a panel for displaying images to a user. The display panel 120 can include a display element which displays images, a driving element which drives the display element, wiring lines which transmit various signals to the display element and the driving element, and the like.

The display element can be defined in different manners depending on the type of the display panel 120. For example, when the display panel 120 is an organic light emitting display panel 120, the display element can be an organic light emitting diode which includes an anode, an organic light emitting layer, and a cathode. For example, when the display panel 120 is a liquid crystal display panel, the display element can be a liquid crystal display element. Hereinafter, even though the display panel 120 is assumed as an organic light emitting display panel, the display panel 120 is not limited to the organic light emitting display panel. Further, since the display device 100 according to the exemplary embodiment of the present disclosure is a rollable display device 100, the display panel 120 can be implemented as a flexible display panel 120 to be wound around or unwound from the roller 161.

The display panel 120 includes an active area AA and a non-active area NA.

The active area AA is an area where images are displayed in the display panel 120. In the active area AA, a plurality of sub pixels which configures the plurality of pixels and a driving circuit for driving the plurality of sub pixels can be disposed. The plurality of sub pixels is minimum units which configure the active area AA and a display element can be disposed in each of the plurality of sub pixels. For example, an organic light emitting diode which includes an anode, an organic light emitting layer, and a cathode can be disposed in each of the plurality of sub pixels, but it is not limited thereto. Further, a driving circuit for driving the plurality of sub pixels can include a driving element, a wiring line, and the like. For example, the driving circuit can be configured by a thin film transistor, a storage capacitor, a gate line, a data line, and the like, but is not limited thereto.

The non-active area NA is an area where no image is displayed. In the non-active area NA, various wiring lines and circuits for driving the organic light emitting diode of the active area AA are disposed. For example, in the non-active area NA, a link line which transmits signals to the plurality of sub pixels and driving circuits of the active area AA or a driving IC such as a gate driver IC or a data driver IC can be disposed, but it is not limited thereto.

In the meantime, the non-active area NA includes a pad area.

The pad area is an area in which a plurality of pads is disposed. The plurality of pads is electrodes which electrically connect the plurality of flexible films 130 and the display panel 120 to each other so that the plurality of flexible films 130 and the display panel 120 can be electrically connected by the plurality of pads. The pad area can be a non-active area NA which overlaps the second support area PA2 of the first cover 110*a* in the non-active area NA. However, the pad area can be formed in the other part of the non-active area NA depending on the arrangement of the plurality of flexible films 130, but is not limited thereto.

Referring to FIG. 4B, a plurality of flexible films 130 is disposed at one end of the display panel 120. The plurality of flexible films 130 is films in which various components are disposed on a base film 131 having flexibility to supply a signal to the plurality of sub pixels which configures the plurality of pixels of the active area AA and the driving circuits and can be electrically connected to the display panel 120. One ends of the plurality of flexible films 130 are disposed in the non-active area NA of the display panel 120 to supply a power voltage or a data voltage to the plurality of sub pixels and the driving circuits of the active area AA. In the meantime, even though eight flexible films 130 are illustrated in FIG. 4B, the number of flexible films 130 can vary depending on the design, but is not limited thereto.

A driving IC 132 such as a gate driver IC or a data driver IC can be disposed on the base film 131 of the plurality of flexible films 130. The driving IC 132 is a component which processes data for displaying images and a driving signal for processing the data. The driving IC 132 can be disposed by a chip on glass (COG), a chip on film (COF), a tape carrier package (TCP), or the like depending on a mounting method. However, for the convenience of description, in FIG. 4B, it is illustrated that the driving IC 132 is mounted on the plurality of flexible films 130 by a chip on film technique, but is not limited thereto.

In the meantime, the plurality of flexible films 130 is components in which a base film, data for displaying images on the base film, and various driving ICs which control data are disposed to display images. The plurality of flexible films 130 is electrically connected to the pad area at one end of the display panel 120 to be bent toward a rear surface of the first cover 110*a*. One ends of the plurality of flexible films 130 are connected to one end of the display panel 120 on one surface of the first cover 110*a* and the other ends of the plurality of flexible films 130 can be disposed at an opposite surface of the one surface of the first cover 110*a*, but is not limited thereto.

Referring to FIG. 4B, the printed circuit board 140 is disposed on the rear surface of the first cover 110*a* to be connected to the plurality of flexible films 130. For example, the printed circuit board 140 is disposed on the rear surface of the first cover 110*a* to be electrically connected to the plurality of flexible films 130. The printed circuit board 140 is a component which supplies signals to the driving IC of the plurality of flexible films 130. Various components can be disposed in the printed circuit board 140 to supply various signals such as a driving signal or a data signal to the driving IC. In the meantime, even though two printed circuit boards 140 are illustrated in FIG. 4B, the number of printed circuit boards 140 can vary depending on the design and is not limited thereto.

An additional printed circuit board which is connected to the printed circuit board 140 can be further disposed. For example, the printed circuit board 140 can be referred to as a source printed circuit board S-PCB on which the data driver is mounted and the additional printed circuit board connected to the printed circuit board 140 can be referred to as a control printed circuit board C-PCB on which a timing controller and the like is mounted. The additional printed circuit board can be disposed in the roller 161 or disposed in the housing unit HP at the outside of the roller 161, or disposed to be in direct contact with the printed circuit board 140.

<Plurality of Protective Blocks>

Figure 5A:
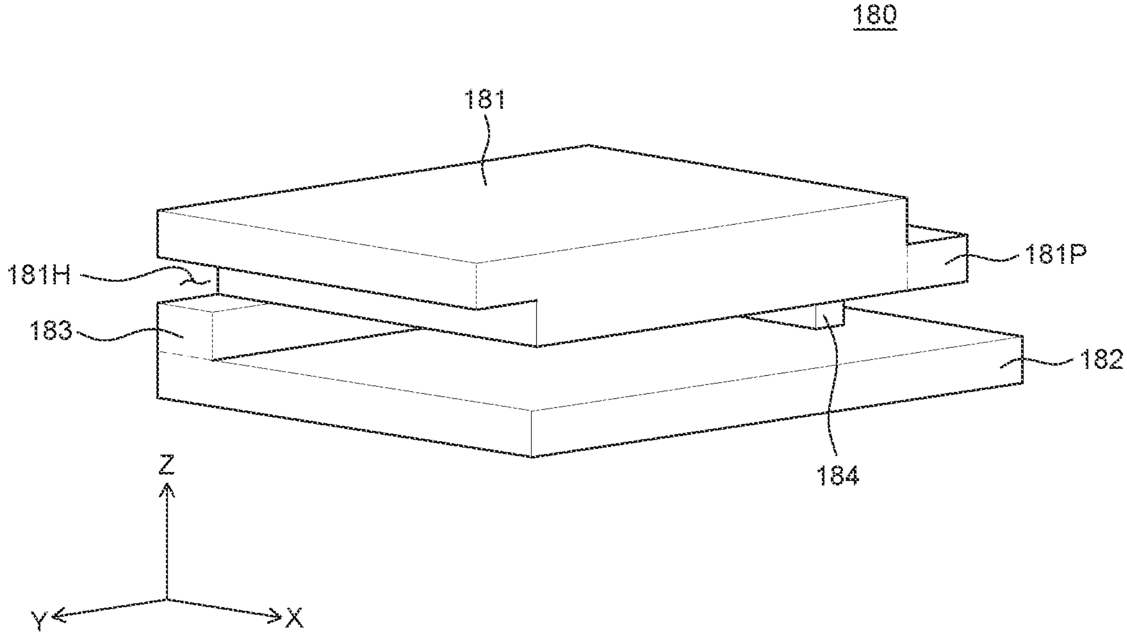
FIG. 5A is a perspective view of a protective block of a display device according to an exemplary embodiment of the present disclosure.
Figure 5B:
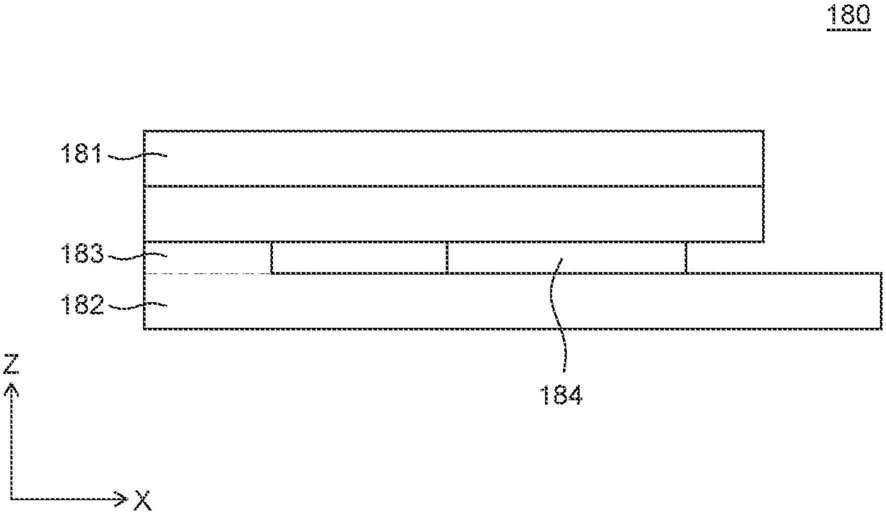
FIG. 5B is a plan view of a protective block of a display device according to an exemplary embodiment of the present disclosure on an X-Z plane.
Figure 5C:
FIG. 5C is a plan view of a protective block of a display device according to an exemplary embodiment of the present disclosure on a Y-Z plane.

FIG. 5A is a perspective view of a protective block of a display device according to an exemplary embodiment of the present disclosure. FIG. 5B is a plan view of a protective block of a display device according to an exemplary embodiment of the present disclosure on an X-Z plane. FIG. 5C is a plan view of a protective block of a display device according to an exemplary embodiment of the present disclosure on a Y-Z plane.

Referring to FIGS. 5A to 5C, the display device 100 further includes a plurality of protective blocks 180 which is inserted into the grooves 110*a*PH of the plurality of protrusions 110*a*P on both sides of the first cover 110*a*. Each of the plurality of protective blocks 180 includes a first part 181, a second part 182, a third part 183, and a fourth part 184.

The first part 181 of the protective block 180 has a protrusion 181P at one side and a groove 181H at the other side. Specifically, referring to FIG. 5A, the first part 181 has a protrusion 181P at one side and a groove 181H at the other side on an X-Y plane. However, it is not limited thereto so that the first part 181 can be defined to have the grooves 181H on both sides on the X-Y plane or can be defined to have the protrusions 181P on both sides.

Each of the plurality of protective blocks 180 can be coupled to the other adjacent protective block 180 by the first part 181. For example, the protrusion 181P of the first part 181 of the protective block 180 is inserted into the groove 181H of the other adjacent protective block 180 so that one protective block 180 can be coupled to the other adjacent protective block 180.

The second part 182 of the protective block 180 can be disposed to be opposite to the first part 181. Specifically, the first part 181 and the second part 182 can be disposed to be opposite to each other so that the first cover 110*a* is inserted into a space therebetween. The second part 182 can have a rectangular parallelepiped shape, but is not limited thereto.

The third part 183 of the protective block 180 can connect the first part 181 and the second part 182. Specifically, the third part 183 is disposed to be adjacent to the edges of the first part 181 and the second part 182 and one surface of the third part 183 is connected to the first part 181 and the other surface thereof is connected to the second part 182. Therefore, the first part 181 and the second part 182 can be disposed to be spaced apart from each other with a distance corresponding to a height of the third part 183 and the first cover 110*a* can be inserted into a space between the first part 181 and the second part 182.

The fourth part 184 of the protective block 180 can protrude from the first part 181 to the second part 182. Therefore, the fourth part 184 can be connected to the first part 181 and the second part 182. However, it is not limited thereto so that the fourth part 184 can be defined to be connected only with the first part 181 and to be spaced apart from the second part 182. Further, the fourth part 184 can also be defined to be connected only with the second part 182 to protrude from the second part 182 to the first part 181 and be spaced apart from the first part 181.

The fourth part 184 of the protective block 180 can be inserted into the groove 110*a*PH of the plurality of protrusions 110*a*P of the first cover 110*a*. Therefore, the fourth part 184 can fix the groove 110*a*PH of the protrusion 110*a*P of the first cover 110*a* to the protective block 180 so that the protrusion 110*a*P of the first cover 110*a* inserted between the first part 181 and the second part 182 does not detach from the protective block 180.

The first part 181, the second part 182, the third part 183, and the fourth part 184 of the protective block 180 can be integrally formed as illustrated in FIGS. 5A to 5C. However, it is not limited thereto so that the first part 181, the second part 182, the third part 183, and the fourth part 184 are separately formed and are connected by means of a separate component such as an adhesive layer or a screw.

Figure 6A:
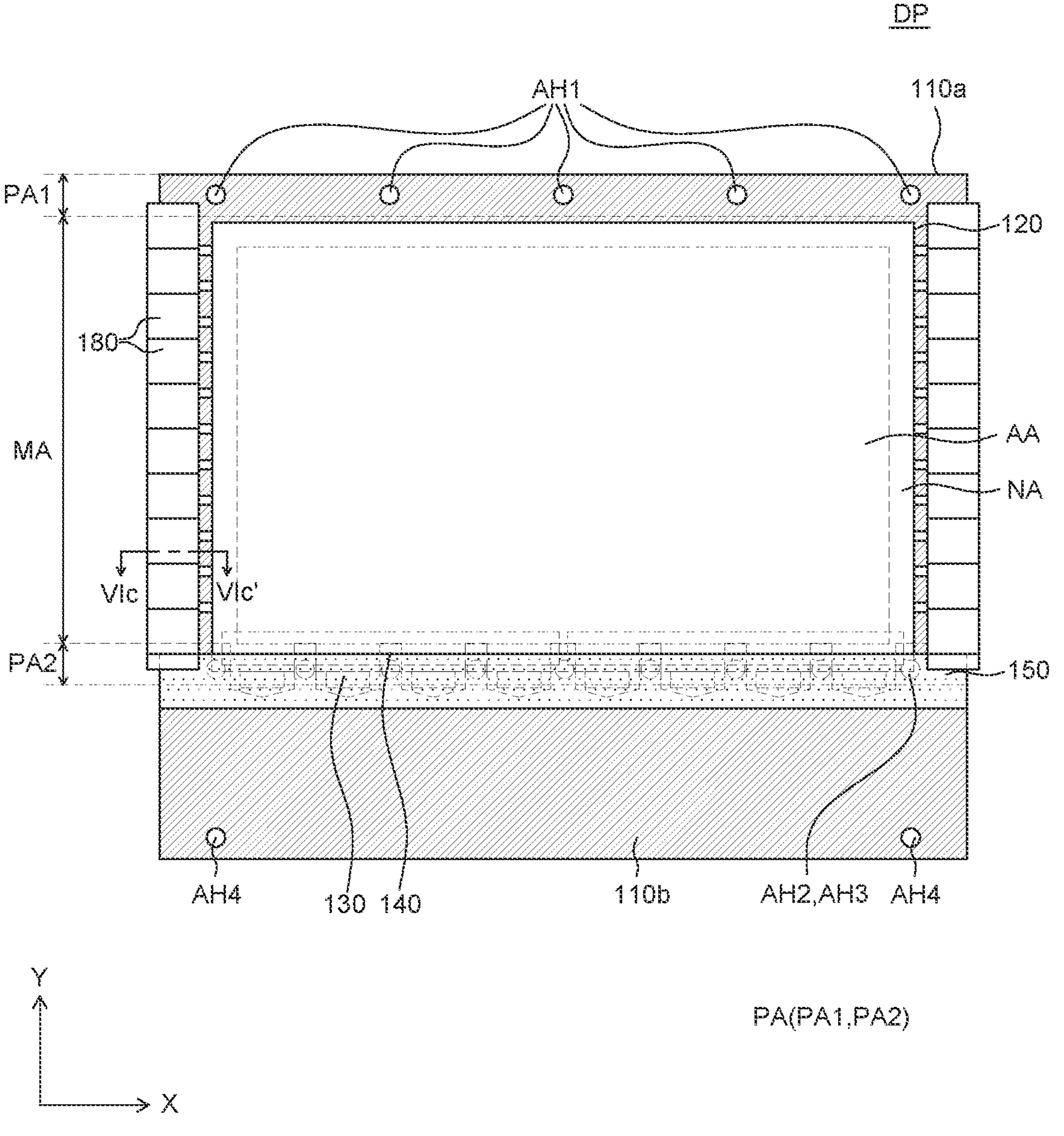
FIG. 6A is a plan view of a display device according to an exemplary embodiment of the present disclosure.
Figure 6B:
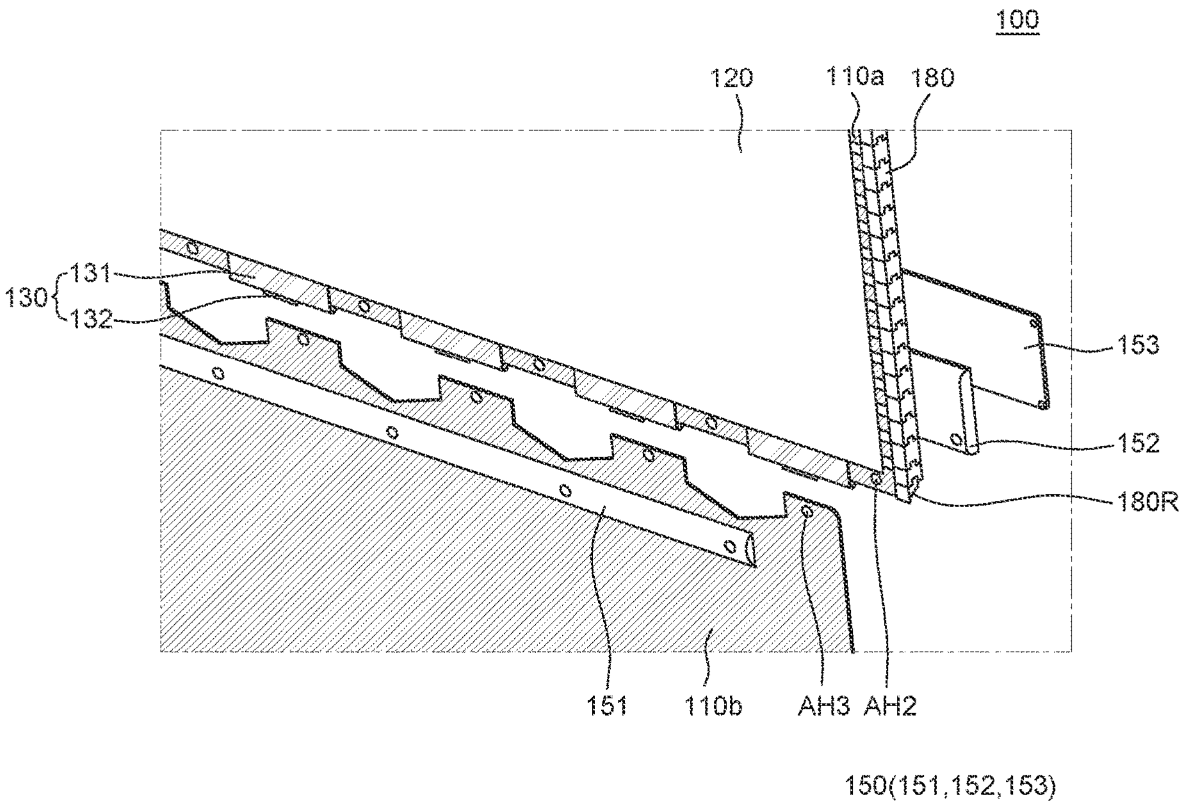
FIG. 6B is an exploded perspective view of a display device according to an exemplary embodiment of the present disclosure.
Figure 6C:
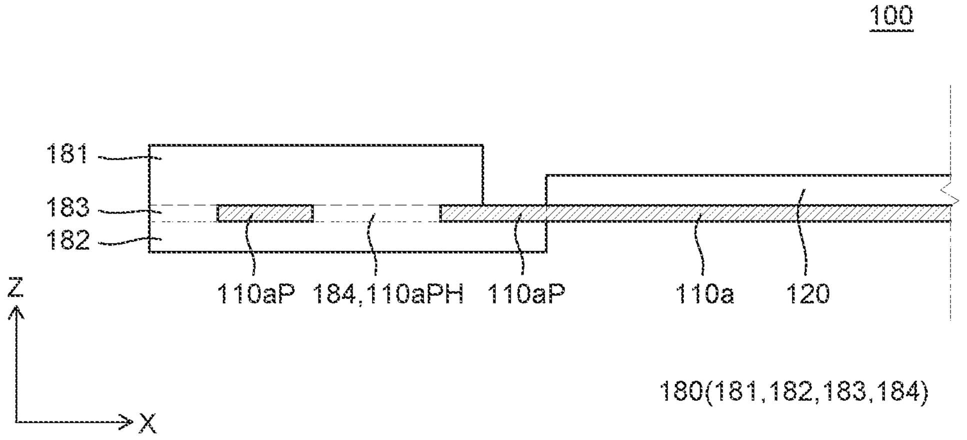
FIG. 6C is a schematic cross-sectional view taken along the line VIc-VIc' of FIG. 6A.
Figure 6D:
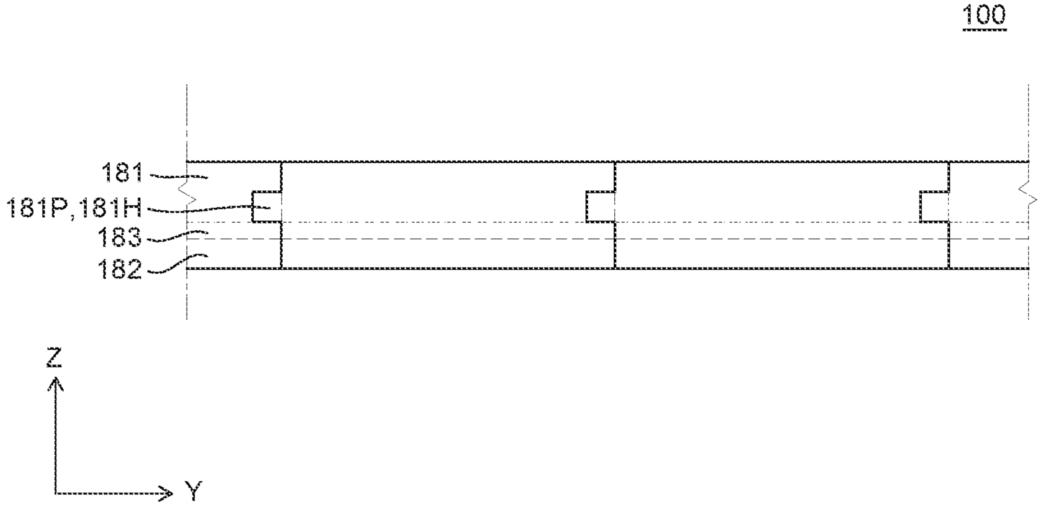
FIG. 6D is a plan view for explaining the coupling of a plurality of protective blocks of a display device according to an exemplary embodiment of the present disclosure on a Y-Z plane.

FIG. 6A is a plan view of a display device according to an exemplary embodiment of the present disclosure and FIG. 6B is an exploded perspective view of a display device according to an exemplary embodiment of the present disclosure. FIG. 6C is a schematic cross-sectional view taken along the line VIc-VIc' of FIG. 6A and FIG. 6D is a plan view for explaining the coupling of a plurality of protective blocks of a display device according to an exemplary embodiment of the present disclosure on a Y-Z plane.

Referring to FIGS. 6A and 6B, the cover unit 150 is disposed in the second support area PA2 of the first cover 110*a* and at one end of the second cover 110*b* to connect the first cover 110*a* and the second cover 110*b*. Further, the cover unit 150 can maintain the pad area at one end of the display panel 120 and the printed circuit board 140 to be flat and protect the plurality of flexible films 130.

The cover unit 150 includes a top cover 151, a bottom cover 152, and a base plate 153.

The top cover 151 is disposed on one surface of the display panel 120. The top cover 151 is disposed so as to cover the pad area which is the non-active area NA of the display panel 120 and the plurality of flexible films 130. The top cover 151 can be disposed so as not to cover the active area AA of the display panel 120, but to cover only the pad area which is the non-active area NA at one end of the display panel 120. If the top cover 151 covers also the active area AA, the images displayed in the active area AA can be blocked. Therefore, the top cover 151 can be disposed so as to overlap only the non-active area NA.

The top cover 151 is formed of a material having a rigidity so that when the display unit DP is wound, the top cover is not deformed and can protect the pad area at one end of the display panel 120 and the plurality of flexible films 130.

An outer side surface of the top cover 151 has a convex shape to be connected to the curved portion 161R of the roller 161 to form a round shape or a circular shape connected to the curved portion 161R of the roller 161. For example, one surface of the top cover 151 can be formed as a curved surface. When the display unit DP is wound, the top cover 151 can form a round shape connected to the curved portion 161R of the roller 161 or a circular shape connected to the curved portion 161R of the roller 161.

The bottom cover 152 is disposed on an opposite surface of the one surface of the first cover 110*a*, for example, on the rear surface of the first cover 110*a*. The bottom cover 152 is disposed between the first cover 110*a* and the printed circuit board 140. The bottom cover 152 can be fixed to one end of the second cover 110*b* and can be disposed so as to correspond to the entire second support area PA2 and a part of the malleable area MA of the first cover 110*a*. The pad area at one end of the display panel 120, the plurality of flexible films 130, and the printed circuit board 140 can be seated in the bottom cover 152.

The base plate 153 is disposed on a rear surface of the bottom cover 152. The base plate 153 can have a plate shape and cover the rear surface of the bottom cover 152 and the exposed surface of the printed circuit board 140.

At this time, the first cover 110*a* and the second cover 110*b* can be fastened by a fixing member which passes through the top cover 151, the second cover 110*b*, the first cover 110*a*, the bottom cover 152, and the base plate 153. Here, the fixing member can be a screw member such as a screw or a bolt, but is not limited thereto.

The base plate 153 can be disposed to correspond to the position in which the printed circuit board 140 is seated in the bottom cover 152 and the bottom cover 152 has a groove having a shape corresponding to a shape of the base plate 153. The base plate 153 is seated in the groove of the bottom cover 152 and a surface formed by connecting one surface of the bottom cover 152 and one surface of the base plate 153 can be formed to be flat without having a protruding portion.

Therefore, the base plate 153 covers an exposed surface of the printed circuit board 140 to accommodate the printed circuit board 140 without being exposed to the outside and further, there is no protrusion on the rear surface of the bottom cover 152. By doing this, when the cover unit 150 is wound around the roller 161, the cover unit 150 can be completely seated in the flat portion 161F of the roller 161.

The plurality of flexible films 130 is bent from one end of the display panel 120 to enclose an end of the first cover 110*a*. The flexible film 130 which is electrically connected to the pad area at one end portion of the display panel 120 is bent toward the rear surface of the bottom cover 152 at the end portion of the first cover 110*a* and can be electrically connected to the printed circuit board 140 which is seated on the rear surface of the bottom cover 152. Therefore, the second cover 110*b* can include a plurality of fastening units FP overlapping the first cover 110*a* and the plurality of flexible films 130 is bent at one end portion of the first cover 110*a* through a space between the plurality of fastening units FP.

<Connection of Protective Block and First Cover>

Referring to FIGS. 6A to 6D, the plurality of protective blocks 180 can be inserted into the grooves 110*a*PH of the plurality of protrusions 110*a*P of the first cover 110*a*. Therefore, the protective block 180 is inserted into the grooves 110*a*PH of the plurality of protrusions 110*a*P of the first cover 110*a* to suppress the edge of the first cover 110*a* from being exposed to the outside.

Referring to FIG. 6B, a protective block 180 which is disposed to be most adjacent to the roller 161, among the plurality of protective blocks 180, can include a curved portion 180R corresponding to a curved surface of the cover unit 150. Therefore, even though a part of the cover unit 150 and a part of the protective block 180 overlap, the winding and the unwinding can be smoothly performed by the curved portion 180R of the protective block 180 corresponding to the curved surface of the cover unit 150. First, a part of a protective block 180 which is disposed to be most adjacent to the roller 161, among the plurality of protective blocks 180, can be disposed to overlap a part of the cover unit 150. In the protective block 180 which overlaps a part of the cover unit 150, a portion including the curved portion 180R overlapping a part of the cover unit 150 and a portion which does not overlap the cover unit 150 are disposed to be divided. By doing this, a phenomenon that a rolling shape by the roller 161 and the cover part 150 has a shape other than the circle due to the flat upper surface of the protective block 180 can be suppressed.

Referring to FIG. 6A, the first part 181 of the protective block 180 which is closest to the head bar 172 of the driving unit MP may not have a protrusion 181P and for example, can be fastened with the head bar 172 by the screw member to be directly connected to the head bar 172, but is not limited thereto.

Referring to FIG. 6C, the plurality of protective blocks 180 can be inserted into the grooves 110*a*PH of the plurality of protrusions 110*a*P on both sides of the first cover 110*a*. At this time, the fourth part 184 of the protective block 180 is inserted into the groove 110*a*PH of the protrusion 110*a*P. The fourth part 184 of the protective block 180 is inserted into the groove 110*a*PH of the protrusion 110*a*P of the first cover 110*a* so that the protective block 180 can be connected to the first cover 110*a* and can be disposed to enclose both edges of the first cover 110*a*.

Referring to FIG. 6C, the first part 181 and the second part 182 of the protective block 180 can be disposed to be in contact with a top surface and a bottom surface of the first cover 110*a*, respectively. However, it is not limited thereto and the first part 181 and the second part 182 of the protective block 180 can be disposed to be spaced apart from the first cover 110*a*. The first part 181 and the second part 182 of the protective block 180 can be disposed so as not to overlap the display panel 120.

Referring to FIG. 6D, each of the plurality of protective blocks 180 can be coupled to the other adjacent protective block 180 by the first part 181. For example, the protrusion 181P of the first part 181 of the protective block 180 is inserted into the groove 181H of the other adjacent protective block 180 so that one protective block 180 can be coupled to the other adjacent protective block 180.

The first cover 110*a* can be formed of a metal material, a plastic material, or the like having a rigidity so that both edges of the first cover 110*a* can be very sharp due to the protrusion 110*a*P of the first cover 110*a*. Further, when the first cover 110*a* is thick, much stress can be generated in order to wind and unwind the display panel 120 and the first cover 110*a*. The first cover 110*a* itself can undergo plastic deformation so that the first cover 110*a* can be formed to have a very small thickness of approximately 200 μm. Therefore, both thin and sharp edges of the first cover 110*a* are vulnerable to the external impact to be easily deformed and there is a risk that the user can be injured by the sharp edge.

Accordingly, in the display device 100 according to the exemplary embodiment of the present disclosure, the protective block 180 is inserted into the groove 110*a*PH of the protrusion 110*a*P of the first cover 110*a* so that the plurality of protective blocks 180 can be disposed to enclose both edges of the first cover 110*a*. Therefore, both edges of the first cover 110*a* are enclosed by the plurality of protective blocks 180 so that both edges of the first cover 110*a* can be protected from the external impact and the user can be protected from both sharp edges of the first cover 110*a*.

Further, the display panel 120 is configured by a plurality of layers formed of materials having different physical properties. Therefore, a curl phenomenon that the display panel 120 is bent in a specific direction by an external environment in which a temperature changes and a humidity changes can be generated.

Accordingly, in the display device 100 according to the exemplary embodiment of the present disclosure, the protective block 180 is inserted into the groove 110*a*PH of the protrusion 110*a*P of the first cover 110*a* so that the plurality of protective blocks 180 can be disposed to enclose both edges of the first cover 110*a*. At this time, the plurality of protective blocks 180 can be disposed to be coupled to the other adjacent protective block 180 on both sides of the first cover 110*a*. Therefore, the plurality of protective blocks 180 can suppress the curl generated in the first cover 110*a* on both sides of the first cover 110*a* together with the display panel 120.

<Detaching Suppressing Unit of First Cover>

Figure 7:
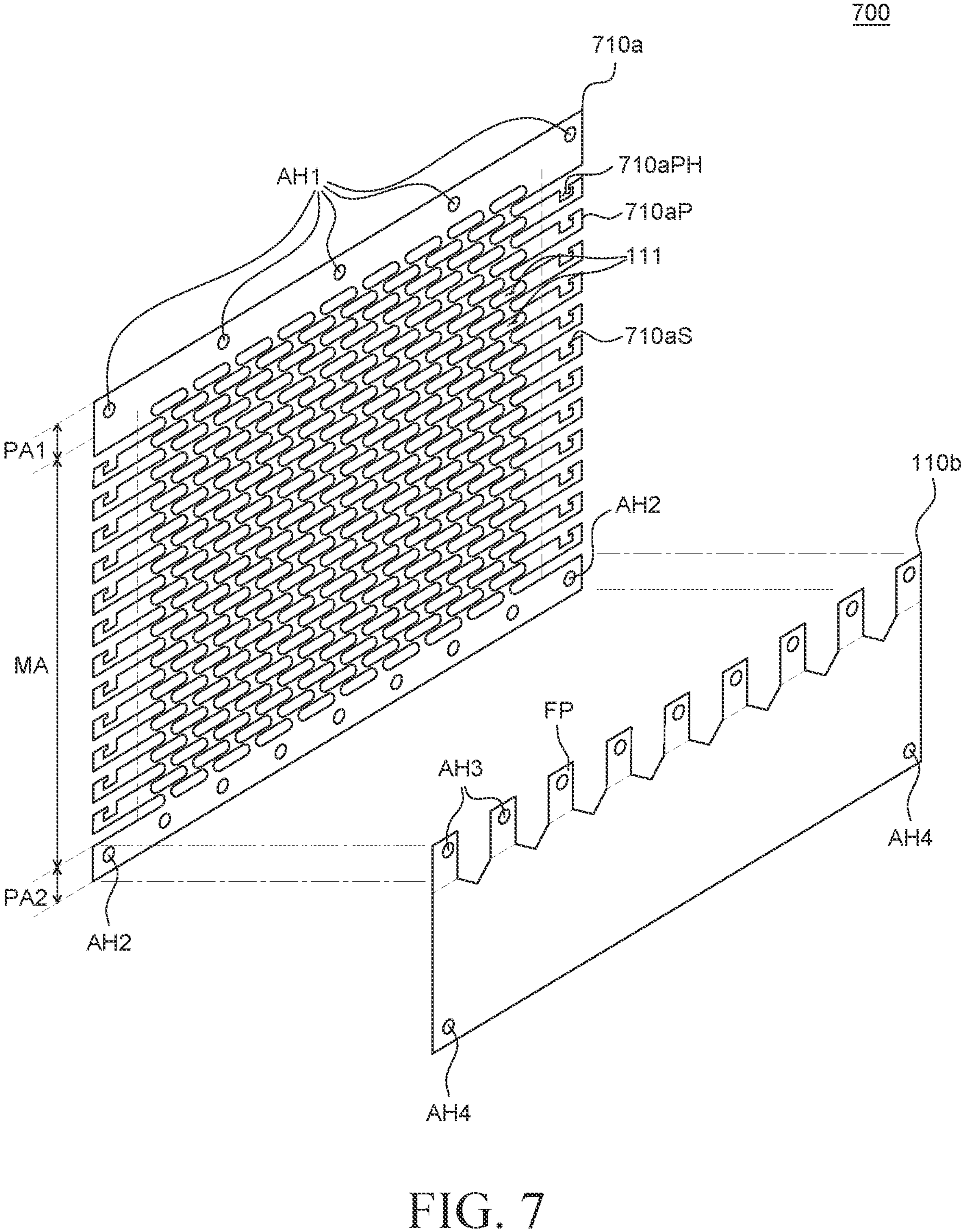
FIG. 7 is an exploded perspective view for explaining a first cover and a second cover of a display device according to another exemplary embodiment of the present disclosure.

FIG. 7 is an exploded perspective view for explaining a first cover and a second cover of a display device according to another exemplary embodiment of the present disclosure. The only difference between a display device 700 of FIG. 7 and the display device 100 of FIGS. 1 to 6C is or can be that only a detaching suppressing unit 710*a*S of a first cover 710*a* is added, but the other configurations are substantially the same, so that a redundant description will be omitted or may be briefly provided. In FIG. 7, for the convenience of description, among various configurations of the display device 700, only a first cover 710*a* and a second cover 110*b* are illustrated.

Referring to FIG. 7, in order to suppress the detaching of the fourth part 184 of the protective block 180 from the groove 710*a*PH of the protrusion 710*a*P of the first cover 710*a*, the display device 700 according to another exemplary embodiment of the present disclosure can further include a detaching suppressing unit 710*a*S. The detaching suppressing unit is disposed at an inlet of the groove 710*a*PH of the protrusion 710*a*P of the first cover 710*a*. The detaching suppressing unit 710*a*S of the first cover 710*a* can protrude from one side of an inlet of the groove 710*a*PH of the protrusion 710*a*P of the first cover 710*a* toward an opposite side of the inlet, but is not limited thereto.

The display device 700 according to another exemplary embodiment of the present disclosure further includes a detaching suppressing unit 710*a*S in the first cover 710*a* so that when the roller 161 is wound or unwound, the detaching of the protective block 180 inserted into the groove 710*a*PH of the protrusion 710*a*P of the first cover 710*a* from the first cover 710*a* can be suppressed. Specifically, the detaching suppressing unit 710*a*S of the first cover 710*a* can be disposed at the inlet of the groove 710*a*PH of the protrusion 710*a*P of the first cover 710*a* to suppress the detaching of the fourth part 184 of the protective block 180 from the groove 710*a*PH of the protrusion 710*a*P of the first cover 710*a*. When the roller 161 is wound or unwound, a movable range of the fourth part 184 of the protective block 180 inserted into the groove 710*a*PH of the protrusion 710*a*P of the first cover 710*a* is limited by the detaching suppressing unit 710*a*S disposed at the inlet of the groove 710*a*PH of the protrusion 710*a*P of the first cover 710*a*. Further, the detaching to the outside of the groove 710*a*PH of the protrusion 710*a*P of the first cover 710*a* can be suppressed. Therefore, when the roller 161 is wound or unwound, the fourth part 184 of the protective block 180 may not detach from the groove 710*a*PH of the protrusion 710*a*P of the first cover 710*a*. Accordingly, the first cover 710*a* of the display device 700 according to another exemplary embodiment of the present disclosure further includes the detaching suppressing unit 710*a*S so that the detaching of the protective block 180 inserted into the groove 710*a*PH of the protrusion 710*a*P of the first cover 710*a* from the first cover 710*a* can be suppressed.

<Size of Plurality of Grooves of Plurality of Protrusions of First Cover>

Figure 8:
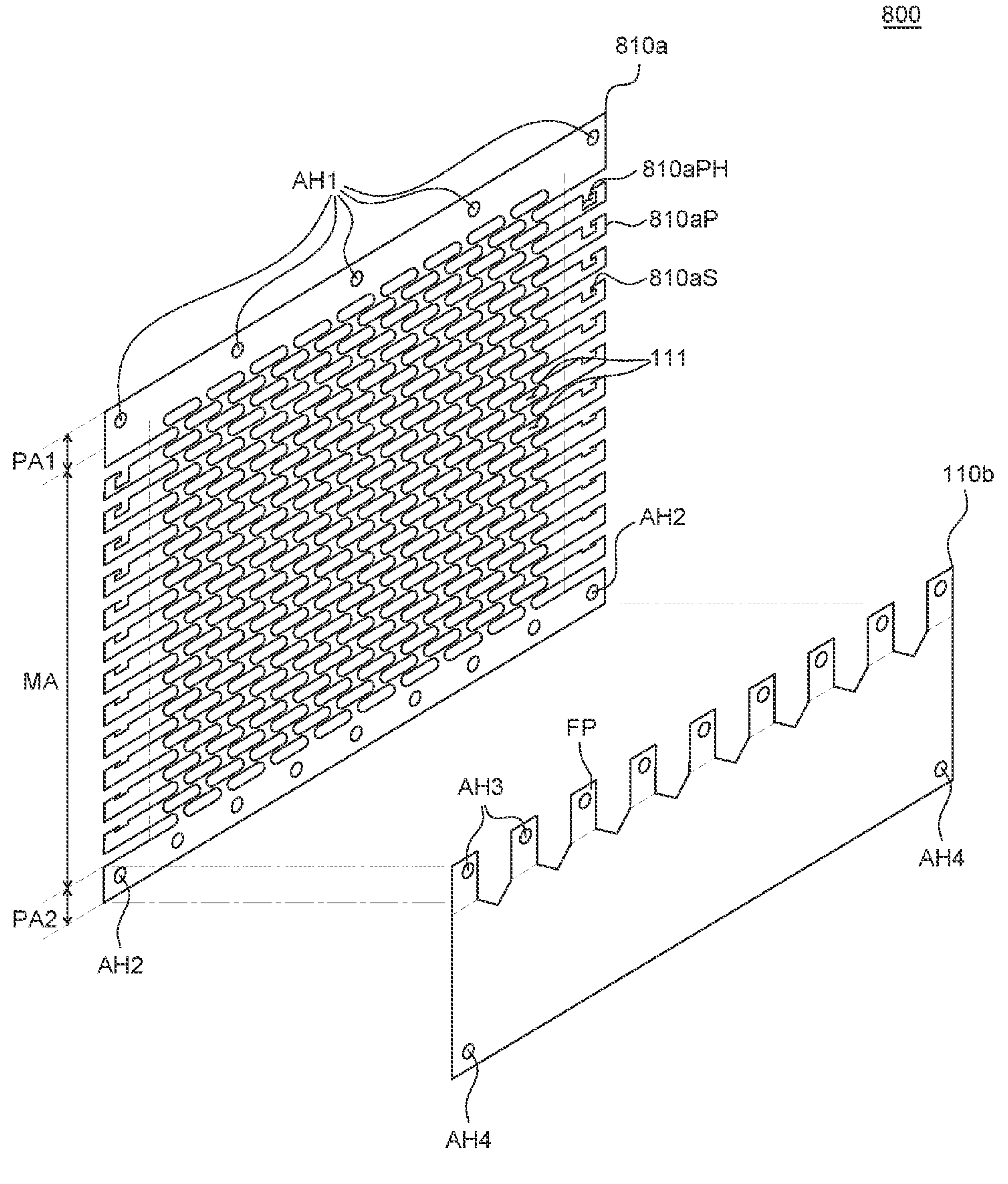
FIG. 8 is an exploded perspective view for explaining a first cover and a second cover of a display device according to still another exemplary embodiment of the present disclosure.

FIG. 8 is an exploded perspective view for explaining a first cover and a second cover of a display device according to still another exemplary embodiment of the present disclosure. The only difference between a display device 800 of FIG. 8 and the display device 700 of FIG. 7 is or can be a size of a plurality of grooves 810*a*PH of a plurality of protrusions 810*a*P of a first cover 810*a*, but the other configurations are substantially the same so that a redundant description will be omitted or may be briefly provided. In FIG. 8, for the convenience of description, among various configurations of the display device 800, only a first cover 810*a* and a second cover 110*b* are illustrated.

Referring to FIG. 8, the farther from the roller 161, the larger the size of the plurality of grooves 810*a*PH of the plurality of protrusions 810*a*P of the first cover 810*a*. Specifically, among the plurality of grooves 810*a*PH of the plurality of protrusions 810*a*P of the first cover 810*a*, a size of a groove 810*a*PH adjacent to the second support area PA2 can be smaller than a size of a groove 810*a*PH adjacent to the first support area PA1. However, it is not limited thereto and the farther from the roller 161, the larger the size of the plurality of grooves 810*a*PH of the plurality of protrusions 810*a*P of the first cover 810*a* or the size of the plurality of grooves can be equal.

In the display device 800 according to still another exemplary embodiment of the present disclosure, the farther from the roller 161, the larger the size of the groove 810*a*PH of the protrusion 810*a*P of the first cover 810*a*. Therefore, when the roller 161 is wound, the plurality of protective blocks 180 can be stably wound around the roller 161 together with the display panel 120 and the first cover 810*a*. Specifically, when the roller 161 is wound, as the display unit DP is disposed to be farther from the roller 161, a degree of deformation when the display unit DP is wound around the roller 161 can be increased. For example, a part of the display unit DP which is disposed to be farther from the roller 161 has a relatively larger radius of curvature at a timing of being wound around the roller 161 so that the strain of the display unit DP can be increased. As the strain of the display unit DP is increased, the fourth part 184 of the protective block 180 inserted into the groove 810*a*PH of the protrusion 810*a*P of the first cover 810*a* can also be significantly movable in the groove 810*a*PH of the protrusion 810*a*P of the first cover 810*a*. Therefore, the groove 810*a*PH of the protrusion 810*a*P of the first cover 810*a* is disposed to be larger as it is farther from the roller 161 so that a space enough to allow the fourth part 184 of the protective block 180 to be movable in accordance with the strain of the display unit DP can be provided. Accordingly, in the display device 800 according to still another exemplary embodiment of the present disclosure, the farther from the second support area PA2, the larger the size of the groove 810*a*PH of the protrusion 810*a*P of the first cover 810*a*. Therefore, the plurality of protective blocks 180 can be stably wound around the roller 161 together with the display panel 120 and the first cover 810*a*.

<Guide Unit of Second Part of Protective Block>

Figure 9A:
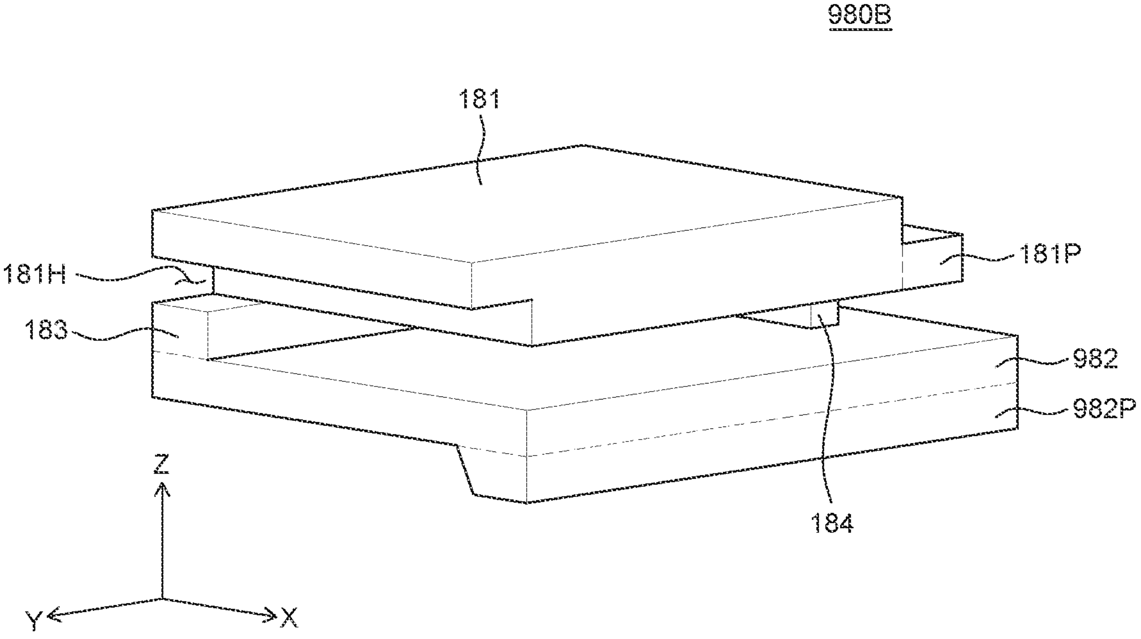
FIG. 9A is a perspective view of a protective block of a display device according to still another exemplary embodiment of the present disclosure.
Figure 9B:
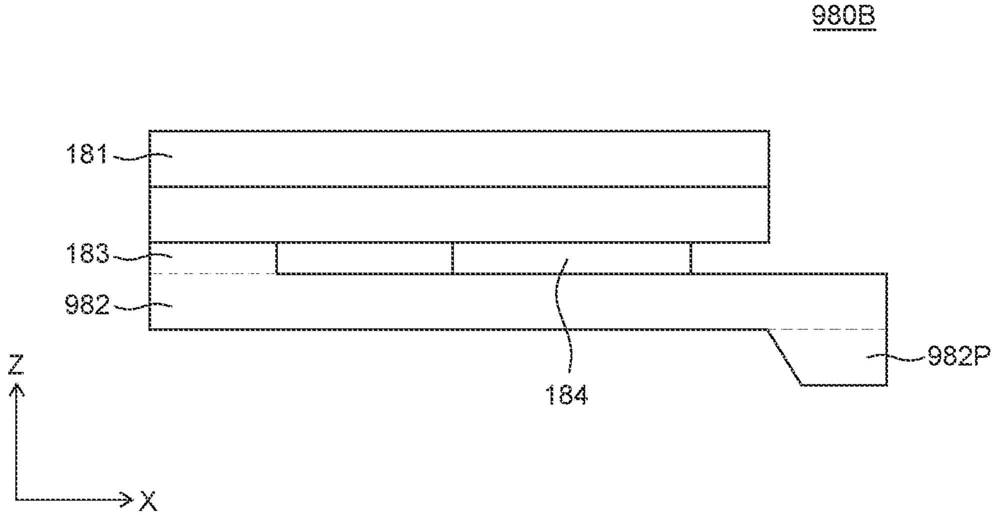
FIG. 9B is a plan view of a protective block of a display device according to still another exemplary embodiment of the present disclosure on an X-Z plane.
Figure 10A:
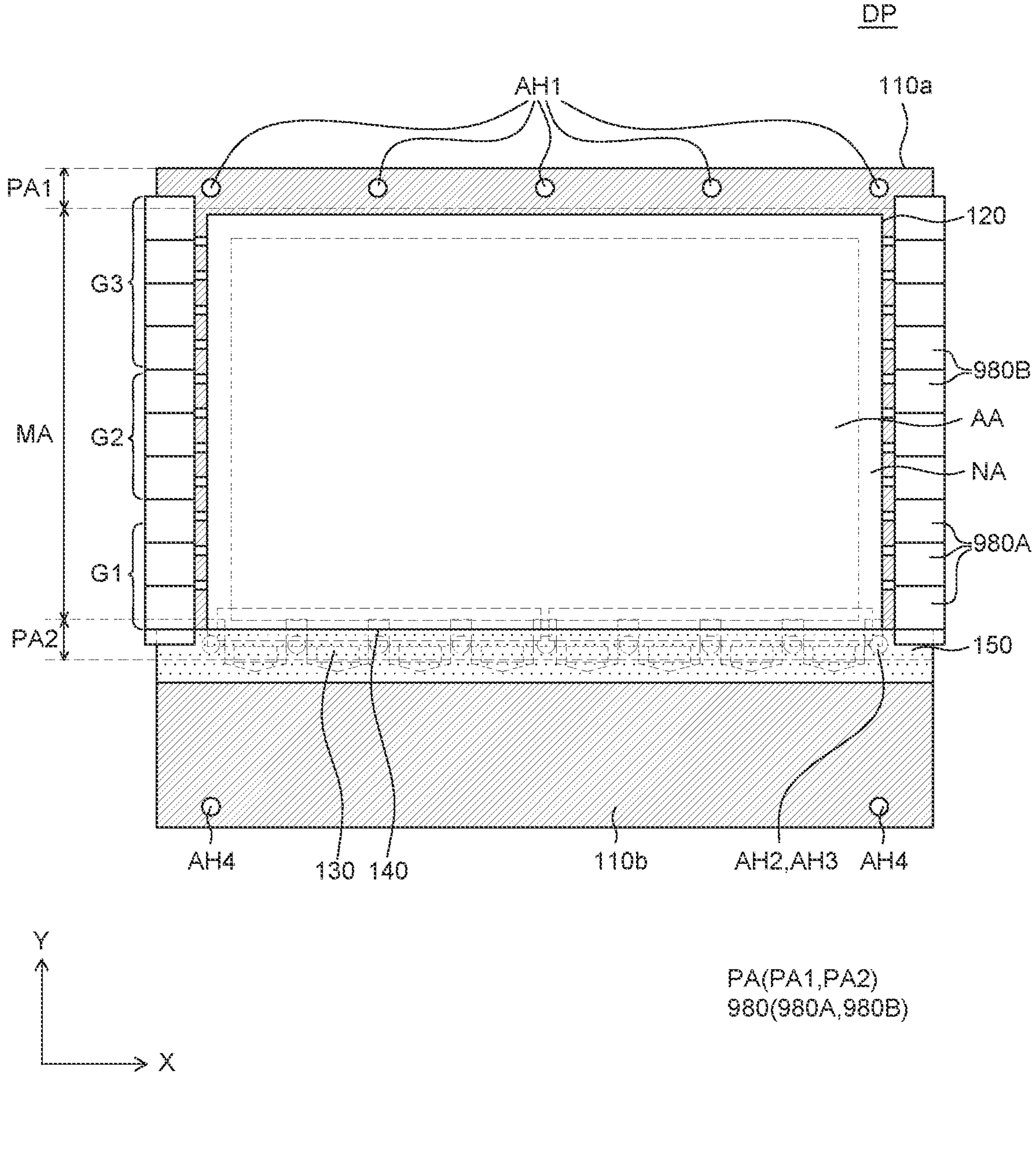
FIG. 10A is a plan view of a display device according to still another exemplary embodiment of the present disclosure.
Figure 10B:
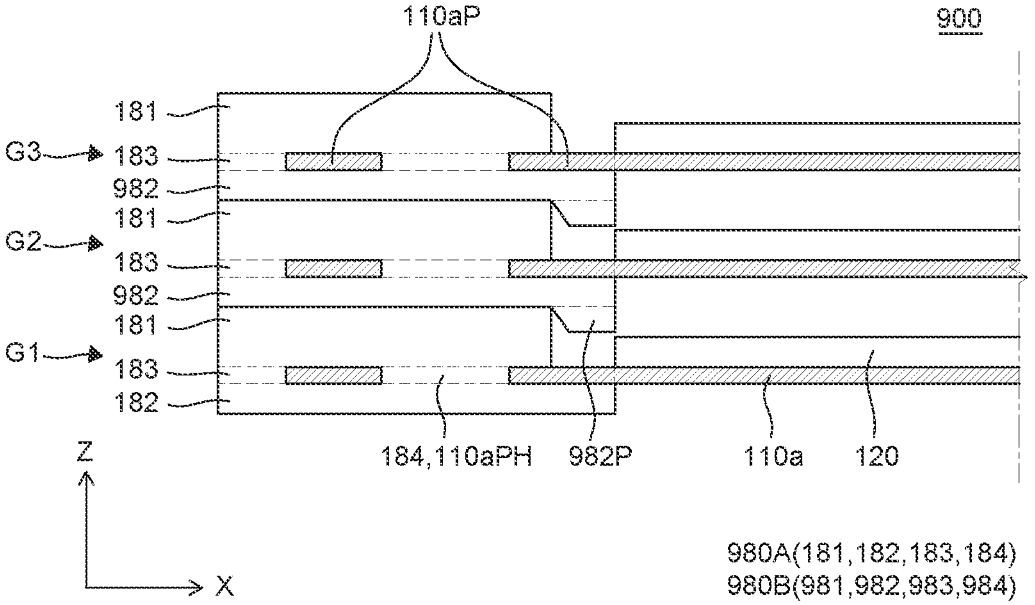
FIG. 10B is a schematic cross-sectional view for explaining an operation of a protective block of a display device according to still another exemplary embodiment of the present disclosure.

FIG. 9A is a perspective view of a protective block of a display device according to still another exemplary embodiment of the present disclosure. FIG. 9B is a plan view of a protective block of a display device according to still another exemplary embodiment of the present disclosure on an X-Z plane. FIG. 10A is a plan view of a display device according to still another exemplary embodiment of the present disclosure. FIG. 10B is a schematic cross-sectional view for explaining an operation of a protective block of a display device according to still another exemplary embodiment of the present disclosure. The only difference between a display device 900 of FIGS. 9A to 10B and the display device 800 of FIG. 8 is or can be a protective block 980, but the other configurations are substantially the same, so that a redundant description will be omitted or may be briefly provided.

Referring to FIGS. 10A and 10B, when the plurality of protective blocks 980 can be grouped according to the number of windings when the roller 161 is wound. For example, the plurality of protective blocks 980 can include a first group G1 which is wound around the roller 161 as a first turn, a second group G2 which is wound as a second turn, and a third group G3 which is wound as a third turn. However, the number of groups of the plurality of protective blocks 980 is not limited to three and can be changed in various ways depending on a design such as a length of the display unit DP, a thickness of the protective block 980, and a size of the roller 161. The protective block 980A of the first group G1 is the same as the protective block 180 described above so that a redundant description will be omitted or may be briefly provided.

When the roller 161 is wound, the protective blocks 980B of the second group G2 and the third group G3 are protective blocks 980 disposed above the other protective block 980A among the plurality of protective blocks 980. At this time, referring to FIGS. 9A and 9B, the protective block 980B has a guide unit 982P protruding downwardly from the second part 982. For example, as illustrated in FIGS. 9A and 9B, the guide unit 982P can have a shape that one end of the second part 982 of the protective block 980 protrudes downwardly from the protective block 980. Even though in FIGS. 9A and 9B, it is illustrated that one side surface of the guide unit 982P has an inclined shape, the shape of the guide unit 982P is not limited thereto.

Referring to FIGS. 9A to 10B, in the display device 900 according to still another exemplary embodiment of the present disclosure, when the roller 161 is wound, a second part 982 of a protective block 980B disposed above the other protective block 980A, among the plurality of protective blocks 980, can have a guide unit 982P which downwardly protrudes. Therefore, when the roller 161 is wound, the protective block 980B can be seated in a right position above the other protective block 980A. For example, when the roller 161 is wound, the guide unit 982P of the second part 982 of the protective block 980B of the second group G2 and the third group G3 can be disposed to be engaged with an upper portion of the protective block 980A of the first group G1. Therefore, the protective block 980B of the second group G2 and the third group G3 and the protective block 980A of the first group G1 can be configured to be engaged with each other when the roller 161 is wound. For example, the protective block 980B of the second group G2 and the third group G3 can be seated in a right position above the protective block 980A of the first group G1. Accordingly, in the display device 900 according to still another exemplary embodiment of the present disclosure, when the roller 161 is wound, the display unit DP can be wound in an exact position.

<Coupling of Plurality of Protective Blocks>

Figure 11A:
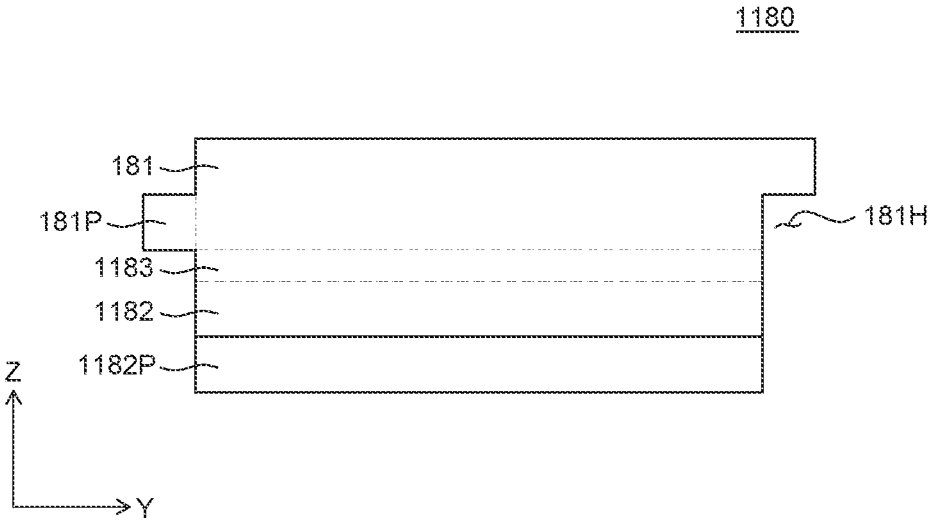
FIG. 11A is a plan view of a protective block of a display device according to still another exemplary embodiment of the present disclosure on a Y-Z plane.
Figure 11B:
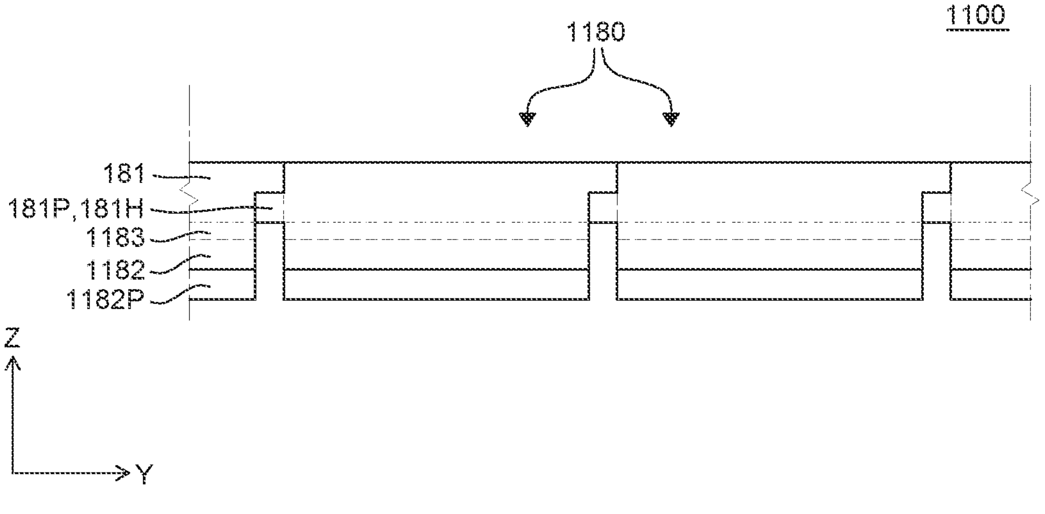
FIGS. 11B and 11C are plan views for explaining the coupling of a plurality of protective blocks of a display device according to still another exemplary embodiment of the present disclosure on a Y-Z plane.
Figure 11C:
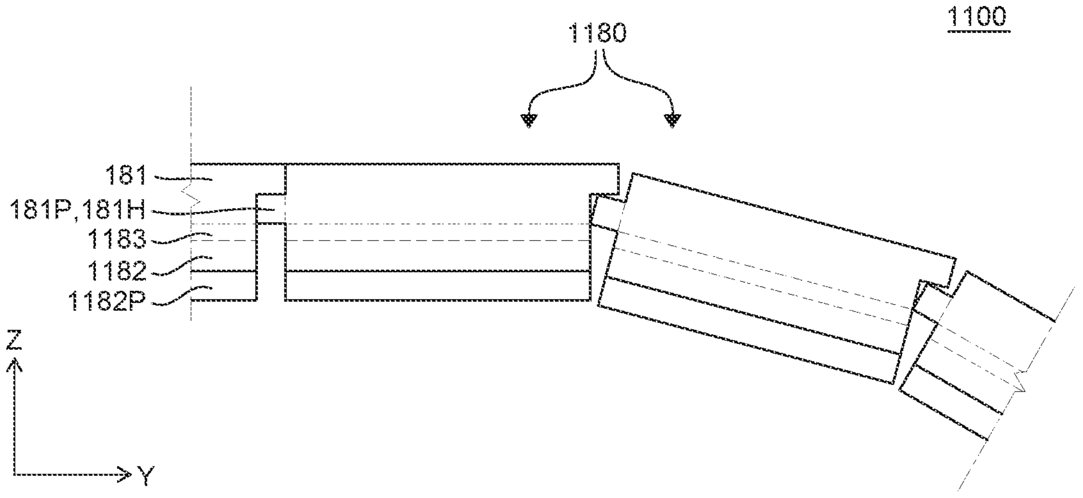

FIG. 11A is a plan view of a protective block of a display device according to still another exemplary embodiment of the present disclosure on a Y-Z plane. FIGS. 11B and 11C are plan views for explaining the coupling of a plurality of protective blocks of a display device according to still another exemplary embodiment of the present disclosure on a Y-Z plane. The only difference between a display device 1100 of FIGS. 11A to 11C and the display device 900 of FIGS. 9A to 10B is or can be a shape of a protective block 1180, but the other configurations are substantially the same, so that a redundant description will be omitted or may be briefly provided. In FIGS. 11A to 11C, for the convenience of description, among various configurations of the display device 1100, only a plurality of protective blocks 1180 is illustrated.

Referring to FIGS. 11A to 11C, in the display device 1100 according to still another exemplary embodiment of the present disclosure, a second part 1182 of one protective block 1180 may not overlap a groove 181H of a first part 181 of the other one protective block 1180 which is adjacent thereto. For example, a second part 1182 of the other one protective block 1180 may not be disposed below the protrusion 181P of one protective block 1180.

In the display device 1100 according to still another exemplary embodiment of the present disclosure, a groove 181H of the first part 181 of the protective block 1180 may not overlap the second part 1182 and the third part 1183. For example, a part of the protective block 1180 can be configured so as not to be disposed below an area in which the protrusion 181P of the first part 181 of one protective block 1180 and the groove 181H of the first part 181 of the other one protective block 1180 are coupled. By doing this, the plurality of protective blocks 1180 can have a movable space during the winding of the roller 161. For example, when the roller 161 is wound, the display unit DP can be wound around the roller 161 so that the plurality of protective blocks 1180 connected to the first cover 810*a* of the display unit DP can also be wound around the roller 161. The protective block 1180 can be configured with a material having a rigidity to protect the first cover 810*a* and even though the protective block is wound around the roller 161, the shape of one protective block 1180 is not changed so that a space in which the protective block 1180 can be wound with a shape close to the shape of the roller 161 can be necessary. Therefore, there is an empty space below an area in which the groove 181H of the first part 181 of the one protective block 1180 is coupled to the protrusion 181P of the first part 181 of the other one protective block 1180. By doing this, the protective block 1180 can have a movable space to be wound around the roller 161 with a more appropriate shape with the curved shape of the roller 161. Accordingly, in the display device 1100 according to still another exemplary embodiment of the present disclosure, when the roller 161 is wound, the plurality of protective blocks 1180 can be more stably wound around the roller 161.

<Through-Hole and Elastic Member of Plurality of Protective Blocks>

Figure 12A:
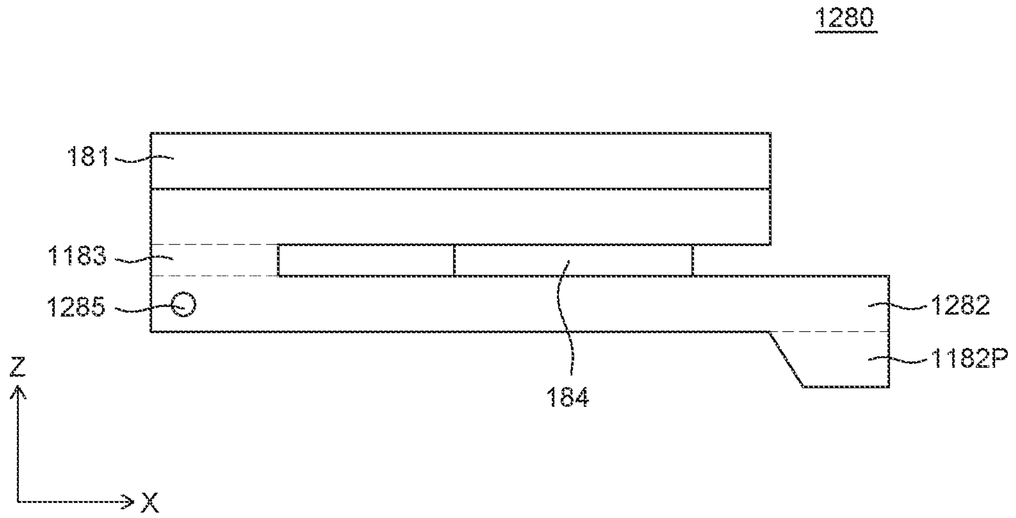
FIG. 12A is a plan view of a protective block of a display device according to still another exemplary embodiment of the present disclosure on an X-Z plane.
Figure 12B:
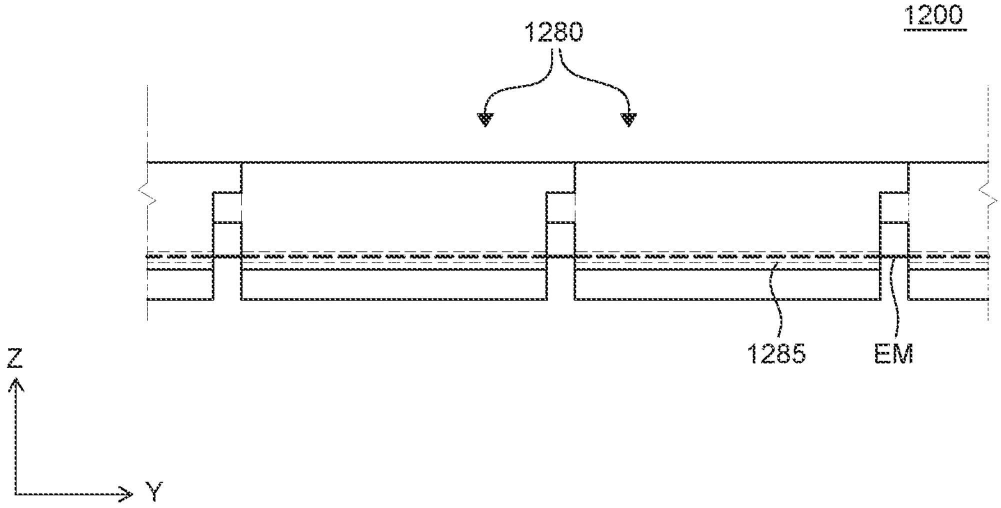
FIG. 12B is a plan view for explaining the coupling of a plurality of protective blocks of a display device according to still another exemplary embodiment of the present disclosure on a Y-Z plane.

FIG. 12A is a plan view of a protective block of a display device according to still another exemplary embodiment of the present disclosure on an X-Z plane. FIG. 12B is a plan view for explaining the coupling of a plurality of protective blocks of a display device according to still another exemplary embodiment of the present disclosure on a Y-Z plane.

The only difference between a display device 1200 of FIGS. 12A and 12B and the display device 1100 of FIGS. 11A to 11C is or can be a protective block 1280, and an elastic member EM, but the other configurations are substantially the same, so that a redundant description will be omitted or may be briefly provided. In FIGS. 12A and 12B, for the convenience of description, among various configurations of the display device 1200, only a plurality of protective blocks 1280 and an elastic member EM are illustrated.

Referring to FIGS. 12A and 12B, the plurality of protective blocks 1280 can include a through-hole 1285. The through-hole 1285 can be disposed in a second part 1282 of the plurality of protective block 1280, but it is not limited thereto and can be disposed in the other part of the protective block 1280. Since the plurality of protective blocks 1280 is disposed to be connected to each other along the Y direction, the through-hole 1285 can have a shape which passes through the protective block 1280 in the Y direction.

Referring to FIG. 12B, the display device 1200 according to still another exemplary embodiment of the present disclosure further includes the elastic member EM which connects the plurality of protective blocks 1280 to each other. The elastic member EM connects the plurality of protective blocks 1280 which is separated from each other to provide a stable connection between the plurality of protective blocks 1280.

The elastic member EM can be disposed in the through-hole 1285 of the plurality of protective blocks 1280. The elastic member EM can be disposed to be inserted into the through-hole 1285 of the protective blocks 1280 to connect the plurality of protective blocks 1280.

The elastic member EM can be formed of a material having an elasticity. When the protective block 1280 is wound around the roller 161, the elastic member EM is elastically deformed in accordance with the shape of the roller 161 and can be wound around the roller 161 together with the plurality of protective blocks 1280. Further, the elastic member EM can have, for example, a wire shape so as to pass through the through-hole 1285 of the plurality of protective blocks 1280, but is not limited thereto.

In the display device 1200 according to still another exemplary embodiment of the present disclosure, the plurality of protective blocks 1280 has the through-hole 1285 and the elastic member EM passes through the through-hole 1285 of the plurality of protective blocks 1280 to connect the plurality of protective blocks 1280 to each other. Specifically, when the roller 161 is wound or unwound, the elastic member EM connects between the plurality of protective blocks 1280 which is wound around the roller 161 or is unwound from the roller 161. Therefore, even though the plurality of protective blocks 1280 is wound around the roller 161 or is unwound from the roller 161 so that the coupled shape is deformed, the plurality of protective blocks 1280 is coupled by the elastic member EM so that the coupling between the plurality of protective blocks 1280 can be more stably maintained. Accordingly, in the display device 1200 according to still another exemplary embodiment of the present disclosure, the elastic member EM which connects the plurality of protective blocks 1280 is used to provide a stable connection of the plurality of protective blocks 1280 when the roller 161 is wound or unwound.

The exemplary embodiments of the present disclosure can also be described as follows:

According to an aspect of the present disclosure, a display device including a display panel; a back cover which is disposed on a bottom surface of the display panel and has a plurality of protrusions on both sides; and a plurality of protective blocks which is inserted into grooves of the plurality of protrusions on both sides of the back cover, where the plurality of protective blocks includes: a first part which has a protrusion at one side and a groove at the other side; a second part which is opposite to the first part; a third part which connects the first part and the second part; and a fourth part which protrudes from the first part toward the second part and is inserted into the grooves of the plurality of protrusions.

The first part is disposed on a top surface of the back cover on which the display panel is disposed to be spaced apart from the display panel and the second part can be disposed on a bottom surface of the back cover.

The back cover can further include a detaching suppressing unit disposed at an inlet of the grooves of the plurality of protrusions to suppress the fourth part from being detached from the grooves of the plurality of protrusions.

The display device can further include a roller which is connected to one end of the back cover, the display panel and the back cover being wound around or unwound from the roller, wherein the farther from the roller, the larger a size of the groove of the plurality of protrusions.

The display device can further include a roller which is connected to one end of the back cover, the display panel and the back cover being wound around or unwound from the roller, wherein when the roller is wound, a protective block disposed above the other protective block, among the plurality of protective blocks, has a guide unit which protrudes downwardly from the second part.

The display device can further include a roller which is connected to one end of the back cover, the display panel and the back cover being wound around or unwound from the roller, and a cover unit which is connected to the back cover and has a curved surface corresponding to a shape of the roller, wherein a protective block disposed to be most adjacent to the roller, among the plurality of protective blocks, includes a curved portion corresponding to the curved surface of the cover unit.

The second part of the protective block can do not overlap the groove of the first part of the protective block.

A protrusion of one protective block among the plurality of protective blocks can be configured to be disposed in the groove of the first part of the other adjacent protective block.

The protrusion of one protective block can be configured to be enclosed by the groove of the first part of the other protective block and the second part.

The protrusion of one protective block can be spaced apart from the second part of the other protective block.

The display device can further include an elastic member which connects the plurality of protective blocks, wherein the plurality of protective blocks includes a through-hole and the elastic member is disposed in the through-hole of the plurality of protective blocks.

According to another aspect of the present disclosure, a display device including a back cover which supports a bottom surface of a display panel; a plurality of protrusions which protrudes from both sides of the back cover toward the outside of the back cover; a groove which is disposed in each of the plurality of protrusions; and a plurality of protective blocks into which the plurality of protrusions of the back cover is inserted, the plurality of protective blocks being fastened with the grooves of the plurality of protrusions, wherein the plurality of protective blocks includes: a first part having a protrusion and a groove; a second part which is opposite to the first part; a third part which connects the first part and the second part; and a fourth part which is configured to protrude from the first part or the second part to be inserted into the grooves of the plurality of protrusions of the back cover, and a protrusion of a first part of the other protective block is inserted into the groove of the first part of the protective block.

The plurality of protrusions of the back cover can be inserted between a lower portion of the first part of the plurality of protective blocks and an upper portion of the second part.

The back cover can further include a detaching suppressing unit which is disposed in the plurality of protrusions and is configured to suppress the fourth part of the protective block inserted into the groove of the plurality of protrusions from being detached from the grooves of the plurality of protrusions.

The back cover can include a first cover and a second cover, the first cover includes a first support area which is an uppermost area of the first cover, a malleable area which extends from the first support area to a lower side of the first cover and is attached with the display panel, and a second support area which extends from the malleable area and is a lowermost area of the first cover. A size of a groove adjacent to the second support area, among the plurality of grooves of the plurality of protrusions of the back cover, is smaller than a size of a groove adjacent to the first support area.

The display device can further include a roller to which the display panel and the back cover are wound or unwound, wherein one end of the second cover is connected to the roller and the other end of the second cover is connected to the second support area of the first cover.

A second part of a protective block adjacent to the first support area, among the plurality of protective blocks, can have a guide unit.

The protrusion of the first part of one protective block among the plurality of protective blocks is inserted into a groove of a first part of the other adjacent protective block and the second part and the third part of one protective block can be spaced apart from a second part and a third part of the other adjacent protective block.

The plurality of protective blocks can further include a through-hole and the plurality of protective blocks is connected by an elastic member which passes through the through-hole.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel;

a back cover which is disposed on a bottom surface of the display panel and has a plurality of protrusions on two sides of the back cover; and a plurality of protective blocks which is inserted into grooves of the plurality of protrusions on the two sides of the back cover, wherein the plurality of protective blocks includes:

a first part which has a protrusion at one side and a groove at another side;

a second part which is disposed opposite to the first part;

a third part which connects the first part and the second part; and a fourth part which protrudes from the first part toward the second part and is inserted into the grooves of the plurality of protrusions.

2. The display device according to claim 1, wherein the first part is disposed on a top surface of the back cover on which the display panel is disposed to be spaced apart from the display panel, and the second part is disposed on a bottom surface of the back cover.

3. The display device according to claim 1, wherein the back cover further includes a detaching suppressing unit disposed at an inlet of the grooves of the plurality of protrusions to suppress the fourth part from being detached from the grooves of the plurality of protrusions.

4. The display device according to claim 1, further comprising:

a roller which is connected to one end of the back cover, the display panel and the back cover being wound around or unwound from the roller, wherein the farther from the roller, the larger a size of the groove of the plurality of protrusions is.

5. The display device according to claim 1, further comprising:

a roller which is connected to one end of the back cover, the display panel and the back cover being wound around or unwound from the roller, wherein when the roller is wound, a protective block disposed above another protective block, among the plurality of protective blocks, has a guide unit which protrudes downwardly from the second part of the plurality of protective blocks.

6. The display device according to claim 1, further comprising:

a roller which is connected to one end of the back cover, the display panel and the back cover being wound around or unwound from the roller, and a cover unit which is connected to the back cover and has a curved surface corresponding to a shape of the roller, wherein a protective block disposed to be most adjacent to the roller, among the plurality of protective blocks, includes a curved portion corresponding to the curved surface of the cover unit.

7. The display device according to claim 1, wherein the second part of the protective block does not overlap the groove of the first part of the protective block.

8. The display device according to claim 1, wherein a protrusion of one protective block among the plurality of protective blocks is configured to be disposed in the groove of the first part of another adjacent protective block.

9. The display device according to claim 8, wherein the protrusion of one protective block is configured to be enclosed by the groove of the first part of the another protective block and the second part.

10. The display device according to claim 8, wherein the protrusion of one protective block is spaced apart from the second part of the another protective block.

11. The display device according to claim 1, further comprising:

an elastic member which connects the plurality of protective blocks, wherein the plurality of protective blocks includes a through-hole, and the elastic member is disposed in the through-hole of the plurality of protective blocks.

12. A display device, comprising:

a back cover which supports a bottom surface of a display panel;

a plurality of protrusions which protrudes from two sides of the back cover toward the outside of the back cover;

a groove which is disposed in each of the plurality of protrusions; and a plurality of protective blocks into which the plurality of protrusions of the back cover is inserted, the plurality of protective blocks being fastened with the grooves of the plurality of protrusions, wherein the plurality of protective blocks includes:

a first part having a protrusion and a groove;

a second part which is disposed opposite to the first part;

a third part which connects the first part and the second part; and a fourth part which is configured to protrude from the first part or the second part to be inserted into the grooves of the plurality of protrusions of the back cover, and a protrusion of a first part of another protective block is inserted into the groove of the first part of the protective block.

13. The display device according to claim 12, wherein the plurality of protrusions of the back cover is inserted between a lower portion of the first part of the plurality of protective blocks and an upper portion of the second part.

14. The display device according to claim 12, wherein the back cover further includes a detaching suppressing unit which is disposed in the plurality of protrusions and is configured to suppress the fourth part of the protective block inserted into the groove of the plurality of protrusions from being detached from the grooves of the plurality of protrusions.

15. The display device according to claim 12, wherein the back cover includes a first cover and a second cover, the first cover includes:

a first support area which is an uppermost area of the first cover;

a malleable area which extends from the first support area to a lower side of the first cover and is attached with the display panel; and a second support area which extends from the malleable area and is a lowermost area of the first cover, and a size of a groove adjacent to the second support area, among the plurality of grooves of the plurality of protrusions of the back cover, is smaller than a size of a groove adjacent to the first support area.

16. The display device according to claim 15, further comprising:

a roller to which the display panel and the back cover are wound or unwound, wherein one end of the second cover is connected to the roller and another end of the second cover is connected to the second support area of the first cover.

17. The display device according to claim 15, wherein a second part of a protective block adjacent to the first support area, among the plurality of protective blocks, has a guide unit.

18. The display device according to claim 12, wherein the protrusion of the first part of one protective block among the plurality of protective blocks is inserted into a groove of a first part of another adjacent protective block, and the second part and the third part of one protective block are spaced apart from a second part and a third part of the another adjacent protective block.

19. The display device according to claim 12, wherein the plurality of protective blocks further includes a through-hole, and the plurality of protective blocks is connected each other by an elastic member which passes through the through-hole.

* * * * *